US012809908B2

(12) United States Patent
Zhu et al.

(10) Patent No.: US 12,809,908 B2
(45) Date of Patent: Nov. 24, 2026

(54) MODIFICATION OF RESPONSIVE CONTENT THAT IS GENERATED USING GENERATIVE MODEL(S) AND THAT INCLUDES OPT-OUT CONTENT

(71) Applicant: GOOGLE LLC, Mountain View, CA (US)

(72) Inventors: Zhenkai Zhu, Fremont, CA (US); Yunjie Li, Sunnyvale, CA (US); Linda Marie Nyberg, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/170,369

(22) Filed: Apr. 4, 2025

(65) Prior Publication Data

US 2026/0134028 A1 May 14, 2026

Related U.S. Application Data

(60) Provisional application No. 63/718,963, filed on Nov. 11, 2024.

(51) Int. Cl.
*G06F 16/00* (2019.01)
*G06F 16/435* (2019.01)
(Continued)

(52) U.S. Cl.
CPC .......... *G06F 16/435* (2019.01); *G06F 16/438* (2019.01); *G06N 3/0475* (2023.01); *G06N 3/08* (2013.01)

(58) Field of Classification Search
None
See application file for complete search history.

(56) References Cited

U.S. PATENT DOCUMENTS 11,704,351 B1 7/2023 Soleimani
11,763,069 B2 9/2023 Makino
(Continued)

OTHER PUBLICATIONS

Feretzakis, G., Verykios, V.S. "Trustworthy AI: Securing Sensitive Data in Large Language Models." 2024, 5, 2773-2800. https://doi.org/10.3390/ai5040134 (Year: 2024).*
(Continued)

*Primary Examiner* — Polina G Peach
(74) *Attorney, Agent, or Firm* — Gray Ice Higdon

(57) ABSTRACT

Implementations described herein relate to determining whether to modify segment(s) of responsive content, that is generated using a generative model (GM), and based on whether the segment(s) include opt-out content. The opt-out content can be associated with a given user or a given entity that has opted-out of: the GM being trained on data, that is associated with the given user or the given entity, since a last training cycle for the GM, or the GM being able to use the data, that is associated with the given user or the given entity, in generating the responsive content. If processor(s) of a system determine that a corresponding segment of the responsive content matches a corresponding segment of the opt-out content, then the processor(s) can modify the corresponding segment of the responsive content to generate modified responsive content, and cause the modified responsive content to be rendered at the client device.

20 Claims, 9 Drawing Sheets

(51) Int. Cl.

| | |
|---|---|
| ***G06F 16/438*** | (2019.01) |
| ***G06N 3/0475*** | (2023.01) |
| ***G06N 3/08*** | (2023.01) |

(56) References Cited

U.S. PATENT DOCUMENTS

| | | | | |
|---|---|---|---|---|
| 11,948,219 | B1 * | 4/2024 | Mendes | G06F 18/25 |
| 12,432,240 | B2 * | 9/2025 | Jones | G06F 21/60 |
| 12,468,846 | B2 * | 11/2025 | Joshi | G06F 21/6245 |
| 12,566,889 | B2 * | 3/2026 | Fisher | G06F 21/6254 |
| 12,626,108 | B2 * | 5/2026 | Padgett | G06N 3/0455 |
| 2013/0124525 | A1 * | 5/2013 | Anderson | G06F 16/278 707/737 |
| 2016/0232570 | A1 * | 8/2016 | Wilson | H04L 67/02 |
| 2018/0113922 | A1 | 4/2018 | Gulwani | |
| 2019/0297060 | A1 * | 9/2019 | Iverson | G06Q 10/02 |
| 2019/0325066 | A1 | 10/2019 | Krishna | |
| 2020/0327136 | A1 * | 10/2020 | Gao | G06F 16/2468 |
| 2020/0364669 | A1 * | 11/2020 | Hay | G06Q 10/103 |
| 2021/0065018 | A1 | 3/2021 | Podgorny | |
| 2021/0295822 | A1 | 9/2021 | Tomkins et al. | |
| 2021/0374338 | A1 | 12/2021 | Shrivastava | |
| 2022/0027508 | A1 * | 1/2022 | Rao | G06N 7/01 |
| 2022/0188567 | A1 * | 6/2022 | Ganesan | G06F 18/2148 |
| 2022/0318522 | A1 | 10/2022 | Wolf | |
| 2022/0377424 | A1 * | 11/2022 | Deng | G06Q 30/0282 |
| 2023/0020886 | A1 | 1/2023 | Mahapatra | |
| 2023/0215202 | A1 * | 7/2023 | Shang | G06V 10/98 382/218 |
| 2024/0160902 | A1 | 5/2024 | Padgett | |
| 2024/0273866 | A1 * | 8/2024 | Adato | G06F 40/30 |
| 2024/0427832 | A1 * | 12/2024 | Ronen | G06F 16/9577 |
| 2025/0068764 | A1 * | 2/2025 | Joshi | G06F 40/20 |
| 2025/0150474 | A1 * | 5/2025 | Jones | G06N 3/0455 |
| 2025/0165444 | A1 * | 5/2025 | Rahimov | G06F 16/215 |
| 2025/0200222 | A1 * | 6/2025 | Monaco | G06F 21/6254 |
| 2025/0291950 | A1 * | 9/2025 | Nadgire | H04L 9/3236 |
| 2025/0307465 | A1 * | 10/2025 | Fisher | G06F 21/6254 |
| 2025/0315449 | A1 * | 10/2025 | Aravamudan | G06F 40/20 |
| 2026/0064984 | A1 * | 3/2026 | Carver | G06F 40/279 |

OTHER PUBLICATIONS

European Patent Office, Communication issued in Application No. 25213302.0, 11 pages, dated Jan. 20, 2026.

Wei, B. et al.;Evaluating Copyright Takedown Methods for Language Models, 37 pages, URL:https://proceedings.neurips.cc/paper_files/paper/2024/file/ faed4276b52ef762879db4142655c699-Paper-Datasets_and_Benchmarks_Track.pdf, dated Oct. 1, 2024.

Min, S. et al.; SILO Language Models: 1-15 Isolating Legal Risk in a Nonparametric G06N Datastore, 29 pages, URL: https://arxiv.org/pdf/2308.04430, dated Jul. 31, 2024.

Gao, L. et al., "RARR: Researching and Revising What Language Models Say, Using Language Models"; Proceedings of the 61st Annual Meeting of the Association for Computational Linguistics (vol. 1: Long Papers); retrieved from the internet: https: arxiv.org/pdf/2210.08726v2.pdf; 30 pages, dated Dec. 4, 2022.

Dunn, A. et al., "Structured information extraction from complex scientific text with fine-tuned large language models"; arXiv.org., Cornell University; arXiv.2212.05238v1; 21 pages; dated Dec. 10, 2022.

Chung, H.W. et al., "Scaling Instruction-Finetuned Language Models"; arXiv.org, Cornell University; arXiv:2210.11416v5; 54 pages; dated Dec. 6, 2022.

* cited by examiner

MODIFICATION OF RESPONSIVE CONTENT THAT IS GENERATED USING GENERATIVE MODEL(S) AND THAT INCLUDES OPT-OUT CONTENT

BACKGROUND

Various generative models (GMs) have been proposed that can be used to process image content, video content, audio content, natural language (NL) content (e.g., typed content or spoken content), and/or other input(s), to generate responsive content that is responsive to these input(s). These GMs are typically trained on enormous amounts of diverse data including data from, but not limited to, webpages, images, videos, electronic books, software code, electronic news articles, and machine translation data. Accordingly, in performing various tasks, these GMs leverage the underlying data on which they were trained, and optionally other data, such as user provided documents, search result documents obtained as part of a retrieval augmented generation (RAG) process, and so on, in generating the responsive content.

In many cases, users and/or entities have a right to control their data and how it is utilized. For instance, some jurisdictions across the world have a so-called "right to be forgotten" or a "right to opt-out" that, among other things, gives these users and/or entities the power to request that their data no longer be utilized in training these GMs and/or utilized by these GMs in generating the responsive content. However, given the enormous amounts of diverse data on which these GMs are typically trained, a duration of time required for a given training cycle to train these GMs can range from weeks to months to years. As a result, and assuming a given entity invokes the right to be forgotten or the right to opt-out, an enormous amount of computational resources would be wasted if a new training cycle, that omits the data associated with the given user or the given entity, was initiated each time that the given user or the given entity invokes the right to be forgotten or the right to opt-out. Accordingly, there is a need in the art for techniques that address the right to be forgotten or the right to opt-out without requiring initiation of a new training cycle of these GMs each time a given user or a given entity invokes the right to be forgotten or the right to opt-out.

SUMMARY

Some implementations described herein relate to determining whether to modify segment(s) of responsive content, that is generated using a generative model (GM), and based on whether the segment(s) include opt-out content. The opt-out content can be associated with a given user or a given entity that has opted-out of: the GM being trained on data, that is associated with the given user or the given entity, since a last training cycle for the GM, or the GM being able to use the data, that is associated with the given user or the given entity, in generating the responsive content. Accordingly, processor(s) of a system can: receive user input that is associated with a client device of a user; generate, based on processing at least the user input and using the GM, the responsive content that is responsive to the user input; and determine whether a corresponding segment of the responsive content matches a corresponding segment of the opt-out content. In response to determining that a corresponding segment of the responsive content matches a corresponding segment of the opt-out content, the processor (s) can: modify the corresponding segment of the responsive content to generate modified responsive content; and cause the modified responsive content, in lieu of the responsive content, to be rendered at the client device of the user. By modifying the responsive content in response to determining that it matches the opt-out content, the processor(s) can effectively ensure data security of the opt-out content without having to immediately initiate a new training cycle for the GM and can conserve computational and/or network resources associated with executing the new training cycle for the GM. Further, the processor(s) can remove the opt-out content from a GM training dataset such that, when the new training cycle for the GM is initiated, the GM is not trained based on the opt-out content.

For example, assume that a given user is an author that manages or controls a blog about all things related to patent law, and the blog includes various online articles related to different topics of patent law. Further assume that the given user interacts with a GM responsive content system that is executed by the processor(s) and indicates a desire to opt-out from the GM being trained on data, that is associated with the given user, or the GM being able to use the data that is associated with the given user, in generating the responsive content. In this example, the processor(s) can determine the data that is associated with the given user and store the data that is associated with the given user in an opt-out content database, and along with an indication of the given user and/or an indication of the given user's blog. Accordingly, when other users interact with the GM responsive content system to obtain responsive content, the processor(s) can compare corresponding segments of the responsive content to the data that is stored in the opt-out content database to ensure that the responsive content does not include data originating from the given user and/or the given user's blog. For instance, the processor(s) can modify the responsive content to omit any corresponding segments that are attributable to the given user or the given user's blog.

However, in various implementations, and prior to modifying the corresponding segment of the responsive content to generate the modified responsive content, the processor(s) can determine whether a corresponding segment of opt-in content matches the corresponding segment of the opt-out content. The opt-in content can be associated with a given additional user or a given additional entity that has opted-in to: the GM being trained on additional data, that is associated with the given additional user or the given additional entity, since the last training cycle for the GM, or the GM being able to use the additional data, that is associated with the given additional user or the given additional entity, in generating the responsive content. Put another way, since the GM is trained on trained on an enormous amounts of diverse data, there is a high likelihood that the corresponding segment of the opt-out content can be found in other opt-in content and, as a result, the processor(s) need not modify the responsive content to omit any corresponding segments that are attributable to the given user or the given user's blog. Rather, the processor(s) can modify the responsive content to attribute the corresponding segment of the responsive content to the given additional user or the given additional entity that has opted-in.

Continuing with the above example, assume that the other user provides user input of "what are the requirements to obtain a patent?". Accordingly, the processor(s) can generate responsive content that includes the requirements to obtain a patent. In this example, further assume that the given user previously published a blog posting about the requirements to obtain the patent, and the responsive content matches the previously published blog posting. However, in response to determining that a corresponding segment of the responsive content matches corresponding segment(s) of the previously published blog posting (e.g., the opt-out content), the processor(s) can then determine whether the corresponding segment(s) of the previously published blog posting (e.g., the opt-out content) matches other opt-in content, such as corresponding segment(s) of the Manual of Patent Examining Procedure (MPEP). Thus, in this example, the processor (s) can attribute the corresponding segment of the responsive content to the MPEP instead of the previously published blog posting even if the corresponding segment of the responsive content is a one-to-one match with content that is included in the previously published blog posting.

The above description is provided as an overview of some implementations of the present disclosure. Further description of those implementations, and other implementations, are described in more detail below.

DETAILED DESCRIPTION OF THE DRAWINGS

Figure 1:
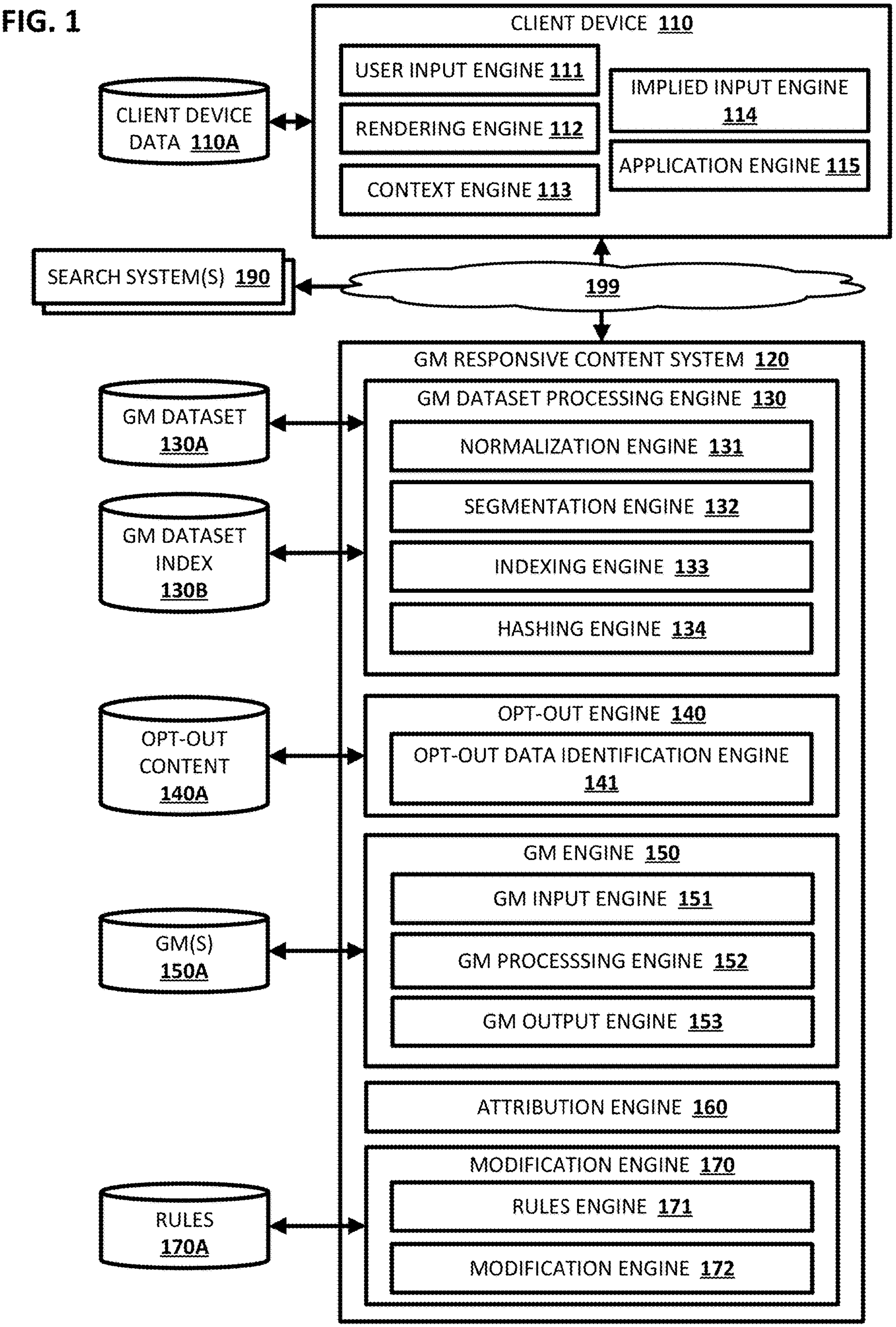
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110, a generative model (GM) responsive content system 120, and search system(s) 190. Although illustrated separately, in some implementations, all or aspects of the GM responsive content system 120 can be implemented locally at the client device 110. In additional or alternative implementations, all or aspects of the GM responsive content system 120 can be implemented remotely from the client device 110 as depicted in FIG. 1 (e.g., at remote server(s)). In those implementations, the client device 110 and the GM responsive content system 120 can be communicatively coupled with each other via one or more networks 199, such as one or more wired or wireless local area networks ("LANs," including Wi-Fi® LANs, mesh networks, Bluetooth®, near-field communication, etc.) or wide area networks ("WANs", including the Internet). Further, the client device 110 and/or the GM responsive content system 120 can interact with the search system(s) 190 via one or more of the networks 199.

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which user input(s) can be submitted and/or responsive content (e.g., that is responsive to the user input(s)) can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser installed on top of the operating system of the client device 110, or the web browser can be a software application that is integrated as part of the operating system of the client device 110. The application engine 115 (and the one or more software applications executed by the application engine 115) can interact with the GM responsive content system 120, and optionally via a dedicated generative content software application, an automated assistant, or the like.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to typed input and/or touch input directed to the client device 110.

Some instances of a user input described herein can be a prompt or query for responsive content that is formulated based on user input provided by a user of the client device 110 and detected via user input engine 111. For example, the prompt or query can be a typed prompt or query that is typed via a physical or virtual keyboard, a suggested prompt or query that is selected via a touch screen or a mouse of the client device 110, a spoken voice prompt or voice query that is detected via microphone(s) of the client device 110, or an image prompt or query that is based on an image or video captured by vision component(s) of the client device 110 (or based on a prompt or query generated based on processing the image or video using, for example, object detection model(s), captioning model(s), etc.). Other instances of user input are contemplated herein.

In various implementations, the client device 110 can include a rendering engine 112 that is configured to render responsive content, an indication of source(s) associated with the responsive, and/or other content for audible and/or visual presentation to a user of the client device 110. For example, the client device 110 can be equipped with one or more speakers that enable the responsive content to be provided for audible presentation to the user via the client device 110. Additionally, or alternatively, the client device 110 can be equipped with a display or projector that enables the content to be provided for visual presentation to the user via the client device 110.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some versions of those implementations, the context engine 113 can determine a context based on data stored in client device data database 110A. The data stored in the client device data database 110A can include, for example, user interaction data that characterizes current or recent interaction(s) of the client device 110 and/or of a user of the client device 110, location data that characterizes a current or recent location(s) of the client device 110 and/or of a user of the client device 110, user attribute data that characterizes one or more attributes of a user of the client device 110, user preference data that characterizes one or more preferences of a user of the client device 110, user profile data that characterizes a profile of a user of the client device 110, and/or other data associated with the client device 110 and/or a user of the client device 110.

For example, the context engine 113 can determine a current context based on a current state of a dialog session (e.g., considering one or more recent prompts or queries provided by a user during the dialog session, responsive content provided by the GM responsive content system 120 during the dialog session), profile data, and/or a current location of the client device 110. For instance, the context engine 113 can determine a current context of "visitor looking for popular events in Louisville, Kentucky" based on a recently issued prompt or query, profile data, and an anticipated future location of the client device 110 (e.g., based on recently booked hotel accommodations and/or flight accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting a prompt or query that is formulated based on user input, in generating an implied prompt or implied query (e.g., a query or prompt formulated independent of user input), and/or in determining to submit an implied prompt or implied query and/or to render result(s) (e.g., responsive content) for an implied prompt or implied query.

In various implementations, the client device 110 can include an implied input engine 114 that is configured to: generate an implied prompt or implied query independent of any user input directed to formulating the implied query or the implied prompt; to submit an implied prompt or implied query, optionally independent of any user input that requests submission of the implied prompt or implied query; and/or to cause rendering of search result(s) or a responsive content for an implied prompt or implied query, optionally independent of any user input that requests rendering of the search result(s) or the responsive content. For example, the implied input engine 114 can use one or more past or current contexts, from the context engine 113, in generating an implied prompt or implied query, determining to submit the implied query or the implied prompt, and/or in determining to cause rendering of search result(s) or responsive content that is responsive to the implied query or the implied prompt. For instance, the implied input engine 114 can automatically generate and automatically submit an implied prompt or implied query based on the one or more past or current contexts. Further, the implied input engine 114 can automatically push the search result(s) or the responsive content that is generated responsive to the implied prompt or implied query to cause them to be automatically rendered or can automatically push a notification of the search result(s) or the responsive content, such as a selectable notification that, when selected, causes rendering of the search result(s) or the responsive content. Additionally, or alternatively, the implied input engine 114 can submit the implied query or the implied prompt at regular or non-regular intervals, and cause the search result(s) or the responsive content for the submission(s) to be automatically provided (or a notification thereof automatically provided). For instance, the implied query or the implied prompt can be "patent news" based on the one or more past or current contexts indicating a user's general interest in patents, the implied query or the implied prompt periodically submitted, and the search result(s) or the responsive content can be automatically provided (or a notification thereof automatically provided). It is noted that the provided search result(s) or responsive content result can vary over time in view of, e.g., presence of new/fresh search result document(s) over time.

Further, the client device 110 and/or the GM responsive content system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The GM responsive content system 120 is illustrated in FIG. 1 as including a GM dataset processing engine 130, an opt-out engine 140, a GM engine 150, an attribution engine 160, and a modification engine 170. Some of these engines can be combined and/or omitted in various implementations. Further, these engines can include various sub-engines. For instance, the GM dataset processing engine 130 is illustrated in FIG. 1 as including a normalization engine 131, a segmentation engine 132, an indexing engine 133, and a hashing engine 134. Further, the opt-out engine 140 is illustrated in FIG. 1 as including opt-out data identification engine 141. Moreover, the GM engine 150 is illustrated in FIG. 1 as including a GM input engine 151, a GM processing engine 152, and a GM output engine 153. Lastly, the modification engine 170 is illustrated in FIG. 1 as including a rules engine 171 and a modification engine 172. Some of these sub-engines can be combined and/or omitted in various implementations. Accordingly, it should be understood that the various engines and sub-engines of the GM responsive content system 120 illustrated in FIG. 1 are depicted for the sake of clarity and are not meant to be limiting.

Further, the GM responsive content system 120 is illustrated in FIG. 1 as interfacing with various databases, such as a GM dataset database 130A, a GM dataset index database 130B, an opt-out content database 140A, a GM(s) database 140A, and a rules database 170A. Although particular engines and/or sub-engines are depicted as having access to particular databases, it should be understood that is for the sake of example and is not meant to be limiting. For instance, in some implementations, each of the various engines and/or sub-engines of the GM responsive content system 120 may have access to each of the various databases. However, in some other implementations, one or more of the various databases may be access-restricted.

As described herein, the GM can be any sequence-to-sequence based machine learning model capable of generating generative vision data, generative audio data, generative textual data, and/or other forms of generative data. Some non-limiting examples of sequence-to-sequence based machine learning models that are capable of generating one or more forms of the generative data noted above include transformer-based machine learning models (e.g., encoder-decoder transformer models, encoder-only transformer models, decoder-only transformer models, etc. that optionally employ an attention mechanism or some other form of memory), stable diffusion-based machine learning models, recurrent neural network-based machine learning models, generative adversarial network-based machine learning models, etc. Various sequence-to-sequence based machine learning models have demonstrated multimodal capabilities in that they are capable of processing inputs in various modalities (e.g., text-based inputs, vision-based inputs, audio-based inputs, etc.) and generating outputs in various modalities (e.g., text-based output, vision-based outputs, audio-based generative outputs, etc.). Some particular non-limiting examples of these sequence-to-sequence based machine learning models that have demonstrated multi-modal capabilities include the Gemini family of models, the ChatGPT family of models, the Claude family of models, the Llama family of models, and/or other families of sequence-to-sequence generative models.

As described in more detail herein, the GM responsive content system 120 can be initially utilized to generate responsive content that is responsive to user input and based on processing at least the user input using the GM. Further, the GM responsive content system 120 can be subsequently utilized to process the responsive content, before it is rendered for presentation to a user of the client device 110 that provided the user input, to determine whether segment(s) of the responsive content match segment(s) of opt-out content. The opt-out can be previously identified based on the GM responsive content system 120 receiving an indication that a given user or a given entity desires to opt-out of a GM being trained on data, that is associated with the given user or the given entity, since a last training cycle for the GM or the GM being able to use the data in generating the responsive content. Notably, the given user or the given entity may have previously opted-in to the GM being able to utilize the data. For instance, a given user or a representative associated with a given entity can interact with the GM responsive content system 120 (e.g., via a software application that is accessible at the client device 110, via an automated assistant that is executed at least in part by the client device 110, etc.) and can provide input that indicates the desire to opt-out. In response to receiving the indication that the given user or the given entity desires to opt-out, the GM responsive content system 120 can identify data that is associated with the given user or the given entity in database(s) (e.g., in the GM dataset 130A, in the GM dataset index 130B, etc.). Further, the GM responsive content system 120 can store an indication of the data that is associated with the given user or the given entity in separate database(s) (e.g., in the opt-out content database 140A), and remove the data that is associated with the given user or the given entity from the database(s) (e.g., in the GM dataset 130A, in the GM dataset index 130B, etc.) to ensure it is not utilized in a subsequent training cycle of training the GM. Accordingly, in response to the responsive content being generated, the GM responsive content system 120 can determine whether segment(s) of the responsive content match segment(s) of the opt-out content. In situations where the segment(s) of the responsive content match the segment(s) of the opt-out content, the GM responsive content system 120 can modify the segment(s) of the responsive content to ensure that the data that is associated with the given user or the given entity is not leveraged in generating the responsive content. As a result, techniques described herein observe the given user or the given entity invoking their right to be forgotten or right to opt-out in a computationally efficient manner that does not require immediate re-training of the GM, thereby conserving utilization of computational and/or network resources by eliminating the need to immediately re-training of the GM and simultaneously enforcing data security of the data that is associated with the given user or the given entity.

Figure 2:
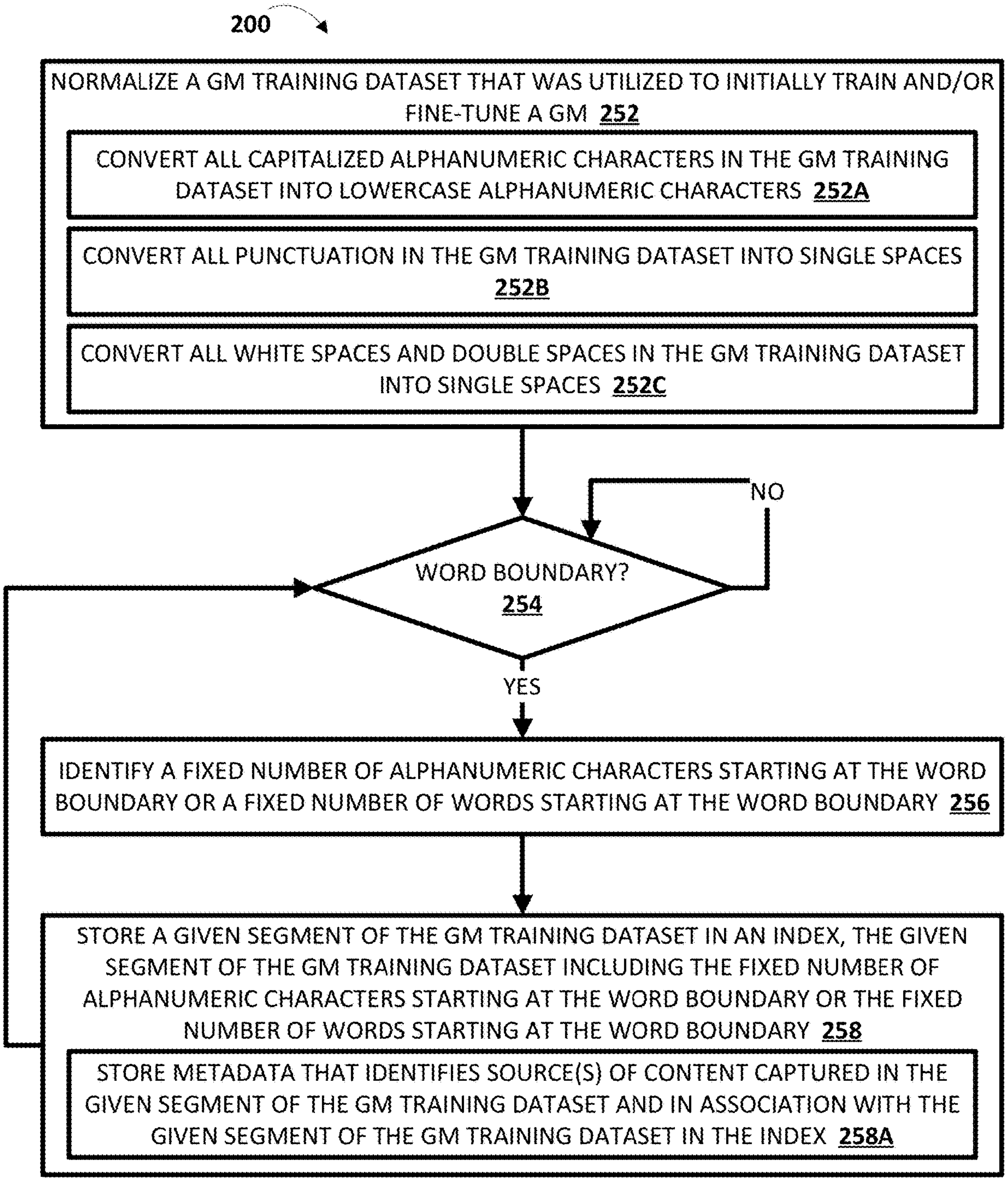
FIG. 2 depicts a flowchart illustrating an example method of processing a GM training dataset that was utilized to initially train a GM and/or fine-tune the GM, in accordance with various implementations.

Turning now to FIG. 2, a flowchart illustrating an example method 200 of processing a GM training dataset that was utilized to initially train a GM and/or fine-tune the GM is depicted. For convenience, the operations of the method 200 are described with reference to a system that performs the operations. This system of the method 200 includes one or more processors, memory, and/or other component(s) of computing device(s) (e.g., client device 110 of FIG. 1, GM responsive content system 120 of FIG. 1, computing device 810 of FIG. 8, one or more servers, and/or other computing devices). Moreover, while operations of the method 200 are shown in a particular order, this is not meant to be limiting. One or more operations may be reordered, omitted, and/or added.

At block 252, the system normalizes a GM training dataset (e.g., stored in the GM dataset database 130A) that was utilized to initially train and/or fine-tune a GM. The system can cause the normalization engine 131 to process the GM training dataset using various normalization operations to normalize the GM training dataset. For example, at sub-block 252A, the normalization engine 131 can convert all capitalized alphanumeric characters in the GM training dataset into lowercase alphanumeric characters. As another example, at sub-block 252B, the normalization engine 131 can convert all punctuation in the GM training dataset into single spaces. As yet another example, at sub-block 252C, the normalization engine 131 can convert all white spaces and double spaces in the GM training dataset into single spaces. Additional, or alternative, normalization operations are contemplated herein.

Notably, the GM training dataset can include natural language content that may be utilized to initially train and/or fine-tune the GM, such as data from webpages (e.g., public domain webpages, licensed webpages, non-public domain webpages, and/or other webpages), electronic books (e.g., public domain electronic books and/or non-public domain electronic books), electronic documents (e.g., electronic word processing documents, electronic PDFs, etc.), electronic communications (e.g., electronic mail, SMS messages, social media posts or messages), software code (e.g., public domain software code, licensed software code, and/or non-public domain software code), electronic news articles, mathematical formulas, machine translation data, and/or any other data from any other source that can be utilized to train and/or fine-tune the GM. Further, the different sources of the different instances of the GM training dataset may each have different formats. However, by normalizing the GM training dataset, the system can more quickly and efficiently compare segment(s) of responsive content to segment(s) of the GM training dataset. Put another way, the GM dataset normalization engine 131 can implement various normalization operations on the dataset in an "offline" manner prior to receiving any user input to enable the system to subsequently compare segment(s) of the responsive content to segment(s) of the GM training dataset.

At block 254, the system processes alphanumeric characters of the normalized GM dataset to identify a word boundary in the normalized GM training dataset. The system can cause the segmentation engine 132 to identify the word boundaries in the normalized GM training dataset. Notably, the word boundary can include any string of alphanumeric characters in the normalized GM training dataset that defines a word. For example, assume that the dataset includes the alphanumeric characters of "prima facie case of patent ineligible subject matter". In this example, "prima" may correspond to a first word boundary, "facie" may correspond to a second word boundary, "case" may correspond to a third word boundary, and so on. The segmentation engine 132 can continually process the normalized GM training dataset to identify word boundaries. If, at an iteration of block 254, the system determines that no word boundary in the normalized GM training dataset has been identified, then the system continues processing the normalized GM training dataset to identify a word boundary at block 254. If, at an iteration of block 254, the system determines that a word boundary has been identified, then the system proceeds to block 256.

At block 256, the system identifies a fixed number of alphanumeric characters starting at the word boundary or a fixed number of words starting at the word boundary. The system can cause the segmentation engine 132 to not only identify the word boundary, but also cause the segmentation engine 132 to identify the fixed number of alphanumeric characters starting at the word boundary or the fixed number of words starting at the word boundary. Notably, the fixed number of alphanumeric characters starting at the word boundary and/or the fixed number of words starting at the word boundary can be a tunable parameter that can be dynamically adjusted by a developer associated with the system.

At block 258, the system stores a given segment of the GM training dataset in an index, the given segment of the GM training dataset including the fixed number of alphanumeric characters starting at the word boundary or the fixed number of words starting at the word boundary. In some implementations, block 258 includes sub-block 258A in which the system stores metadata that identifies one or more sources of content captured in the given segment of the GM training dataset and in association with the given segment of the GM training dataset in the index. The system can cause the indexing engine 133 to store the given segment of the GM training dataset in the index (e.g., the GM dataset index 130B), and optionally in association with an indication of the one or more sources thereof. The system returns to block 254 to process the alphanumeric characters of the normalized dataset to identify an additional word boundary in the normalized dataset. Notably, a quantity of the segments stored in the GM dataset index database 130B can be in the order of hundreds of billions or trillions of segments.

Continuing with the above example where the GM training dataset includes the alphanumeric characters of "prima facie case of patent ineligible subject matter", further assume that the system utilizes the fixed number of words starting at the word boundary, and further assume that the fixed number of words starting at the words boundary corresponds to six as defined by the developer associated with the system. In this example, a first dataset alphanumeric segment may correspond to "prima facie case of patent ineligible" that starts at the first word boundary of "prima", a second dataset alphanumeric segment may correspond to "facie case of patent ineligible subject" that starts at the second word boundary of "facie", a third dataset alphanumeric segment may correspond to "case of patent ineligible subject matter" that starts at the third word boundary of "case", and so on. Further, the system can store each of the dataset alphanumeric segments in an index.

Further, and continuing with the above example where the GM training dataset includes the alphanumeric characters of "prima facie case of patent ineligible subject matter", further assume that the alphanumeric characters of "prima facie case of patent ineligible subject matter" are associated with one or more sources. For instance, the alphanumeric characters of "prima facie case of patent ineligible subject matter" may be associated with an electronic document corresponding to the Manual of Patent Examining Procedure (MPEP) that was utilized to initially train and/or fine-tune the GM. Accordingly, in this instance, the alphanumeric characters can be stored in association with metadata that indicates the alphanumeric characters of "prima facie case of patent ineligible subject matter" is derived from the MPEP and optionally include a link (e.g., a uniform resource locator (URL)) to an electronic version of the MPEP.

In various implementations, one or more iterations of the operations of the method 200 of FIG. 2 can be performed in parallel. For instance, the system can continue normalizing the GM training dataset while the system also identifies the word boundaries, identifies the dataset alphanumeric segments, and stores the dataset alphanumeric segments in the index. Further, although the above alphanumeric segments from the above example are described as including six words, it should be understood that is for the sake of example and is not meant to be limiting. Rather, it should be understood that the developer associated with the system (or a developer associated with the third-party) can define different lengths of the alphanumeric segments.

Although the method 200 of FIG. 2 is described with respect to generating the index of the GM training dataset in a particular manner, it should be understood that is for the sake of example to illustrate various techniques contemplated herein, and is not meant to be limiting. For example, in additional or alternative implementations, the system can generate Bloom Filter(s) for the respective segments of the GM training dataset, as opposed to raw strings of the normalized GM training dataset. These Bloom Filter(s) can offer better compression in terms of storage space, and, as a result, can enable the storage of more segments. However, these Bloom Filter(s) may not provide the option for storing the corresponding metadata in association with the segments that include the source(s) of the content captured in the segments. Thus, these Bloom Filter(s) may add a layer of complexity that is obviated through utilization of the GM dataset index 130B.

As another example, in additional or alternative implementations, the system can cause the hashing engine 134 to generate, using a hash function, hashes for the respective segments of the GM training dataset, as opposed to raw strings of the normalized GM training dataset. Similar to the aforementioned Bloom Filter(s), these hashes can offer better compression in terms of storage space, and, as a result, can enable the storage of more segments. However, and similar to the aforementioned Bloom Filter(s), these hashes may not provide the option for storing the corresponding metadata in association with the segments that includes the source(s) of the content captured in the segments. Thus, these Bloom Filter(s) may add a layer of complexity that is obviated through utilization of the GM dataset index 130B. Moreover, both the Bloom Filter(s) and hashes may be limited in that they are more conducive to only detecting exact matches and not enable fuzzy matching (e.g., as described with respect to the corresponding edit distance and FIG. 6).

Figure 3:
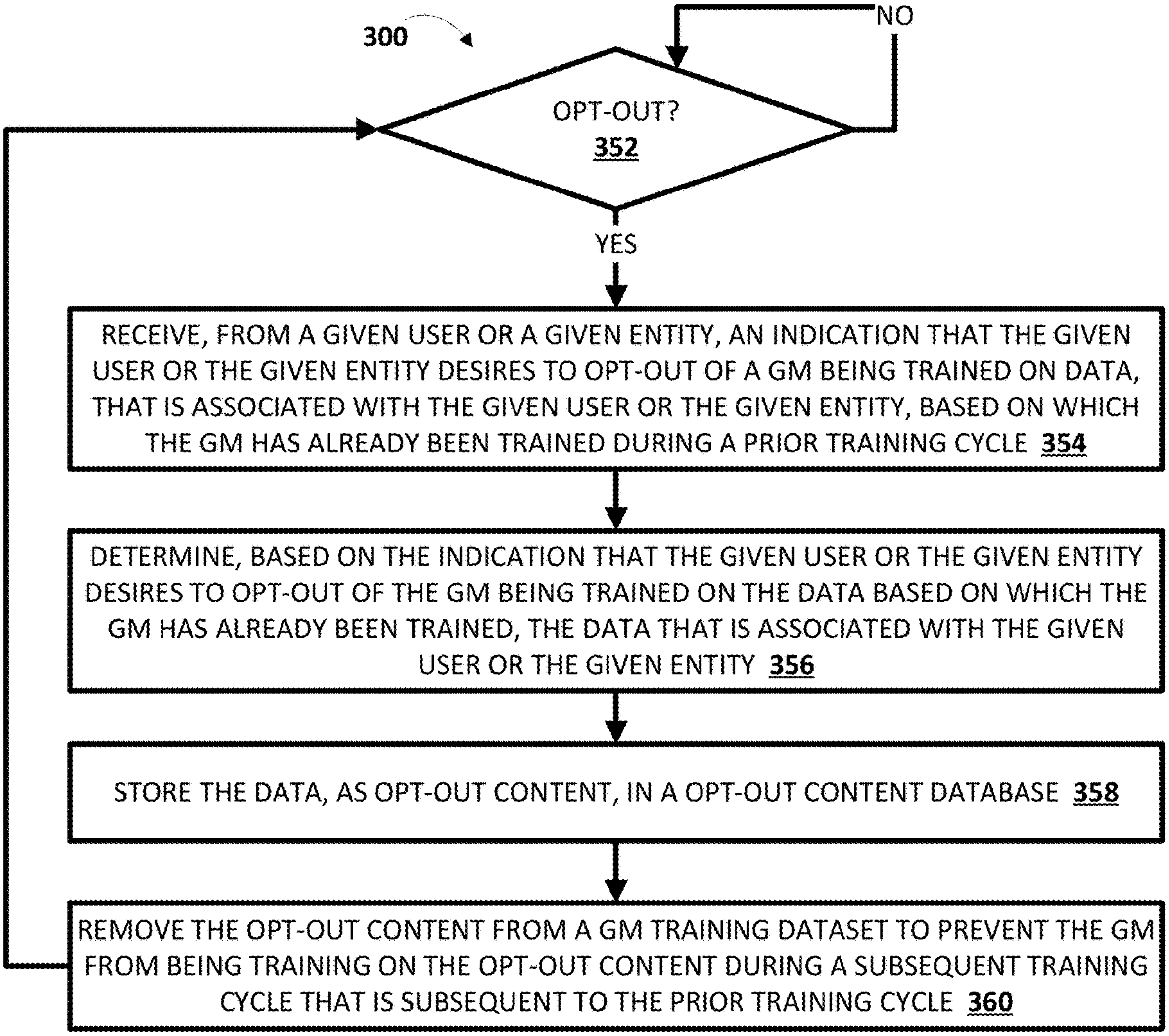
FIG. 3 depicts a flowchart illustrating an example method of determining opt-out content for a given user or a given entity has opted-out of a GM being trained on data, that is associated with the given user or the given entity, and/or the GM being able to use the data in generating responsive content, in accordance with various implementations.

Turning now to FIG. 3, a flowchart illustrating an example method 300 of determining opt-out content for a given user or a given entity has opted-out of a GM being trained on data, that is associated with the given user or the given entity, and/or the GM being able to use the data in generating responsive content is depicted. For convenience, the operations of the method 300 are described with reference to a system that performs the operations. This system of the method 300 includes one or more processors, memory, and/or other component(s) of computing device(s) (e.g., client device 110 of FIG. 1, GM responsive content system 120 of FIG. 1, computing device 810 of FIG. 8, one or more servers, and/or other computing devices). Moreover, while operations of the method 300 are shown in a particular order, this is not meant to be limiting. One or more operations may be reordered, omitted, and/or added.

At block 352, the system checks for opt-outs of users and/or entities that indicate a desire to opt-out of a GM being trained on data, that is associated with the users or the entities, since a last training cycle for the GM, or the GM being able to use the data, that is associated with the users or entities, in generating responsive content. For example, the system can cause the opt-out engine 140 to check for the opt-outs of the users and/or the entities. In some implementations, the opt-out engine 140 can check for opt-out of users and/or entities in a continuous manner such that the opt-out engine 140 can initiate the operations of blocks 354-360 in response to detecting that the users and/or the entities have indicated a desire to opt-out. In additional or alternative implementations, the opt-out engine 140 can check for opt-out of users and/or entities in a periodic manner such that the opt-out engine 140 can initiate the operations of blocks 354-360 at a particular time (e.g., every night, once a week, once a month, etc.) and based on detecting that the users and/or the entities have indicated a desire to opt-out. If, at an iteration of block 352, the system determines that there are no opt-outs, then the system continues to monitor for opt-outs at block 352. If, at an iteration of block 352, the system determines that there is one or more opt-outs, then the system proceeds to block 354.

At block 354, the system receives, from a given user or a given entity, an indication that the given user or the given entity desires to opt-out of a GM being trained on data, that is associated with the given user or the given entity, based on which the GM has already been trained during a prior training cycle. The given user or the given entity can provide input that indicates the desire to opt-out by, for example, interacting with the system via a software application that is accessible at a client device of the given user or a representative associated with the given entity, interacting with an automated assistant that is executed at least in part by a client device of the given user or a representative associated with the given entity, interacting with a web browser that is accessible at a client device of the given user or a representative associated with the given entity, interacting with settings at a client device of the given user or a representative associated with the given entity, etc.

At block 356, the system determines, based on the indication that the given user or the given entity desires to opt-out of the GM being trained on the data based on which the GM has already been trained, the data that is associated with the given user or the given entity. Notably, the normalized and segmented GM training dataset and/or the corresponding hashes for the GM training dataset (e.g., stored in the GM dataset index 130B) that are generated and stored according to the method 200 of FIG. 2 can be stored in association with metadata that indicates a corresponding source associated with the normalized and segmented GM training dataset and/or the corresponding hashes for the GM training dataset. Accordingly, the system can cause the opt-out data identification engine 141 to search the metadata that indicates the corresponding source associated with the normalized and segmented GM training dataset and/or the corresponding hashes for the GM training dataset to identify those that are associated with the given user or the given entity that indicated the desire to opt-out.

At block 358, the system stores the data, as opt-out content, in an opt-out content database. At block 360, the system removes the opt-out content from a GM training dataset to prevent the GM from being training on the opt-out content during a subsequent training cycle that is subsequent to the prior training cycle. Put another way, the system can store the normalized and segmented GM training dataset and/or the corresponding hashes for the GM training dataset that are associated with the given user or the given entity in the opt-out content database 140A. By storing the data in the opt-out content database 140A, the system can subsequently determine whether a corresponding segment of responsive content generated by the GM is generated by leveraging data associated with the given user or the given entity (e.g., as described with respect to FIG. 4). Further, by removing the opt-out content from the GM dataset 130A, the system can ensure that the GM is not subsequently trained based on the opt-out content during the subsequent training cycle of the GM. In some implementations, the system can optionally store an identifier associated with the given user or the given entity in the opt-out content database and in associated with the opt-out content. Accordingly, even in situations where content associated with the given user or the given entity is subsequently obtained using a retrieval augmented generation process, the system can discard this content to refrain from utilizing it in generating responsive content and based on the given user or the given entity opting-out. The system returns to block 352 to perform an additional iteration of the method 300 with respect to a given additional user or given additional entity.

Although the method 300 of FIG. 3 is described with respect to determining and storing the opt-out content for only the given user or the given entity, it should be understood that is for the sake of example to illustrate techniques contemplated herein and is not meant to be limiting. Rather, it should be understood that multiple iterations of the method 300 of FIG. 3 can be performed in a parallel manner.

Figure 4:
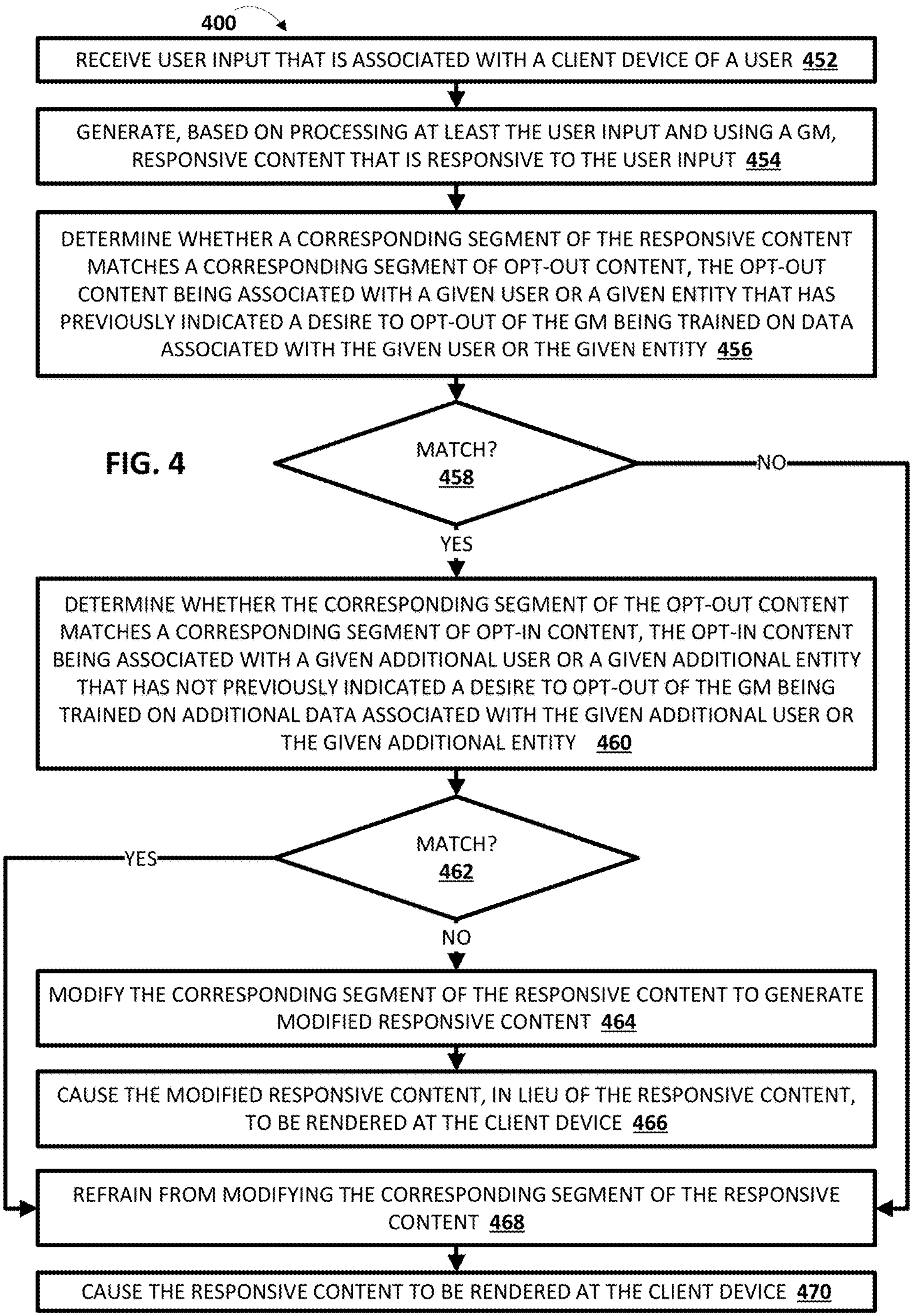
FIG. 4 depicts a flowchart illustrating an example method of determining whether to modify responsive content generated using a GM, in accordance with various implementations.

Turning now to FIG. 4, a flowchart illustrating an example method 400 of determining whether to modify responsive content generated using a GM is depicted. For convenience, the operations of the method 400 are described with reference to a system that performs the operations. This system of the method 400 includes one or more processors, memory, and/or other component(s) of computing device(s) (e.g., client device 110 of FIG. 1, GM responsive content system 120 of FIG. 1, computing device 810 of FIG. 8, one or more servers, and/or other computing devices). Moreover, while operations of the method 400 are shown in a particular order, this is not meant to be limiting. One or more operations may be reordered, omitted, and/or added.

At block 452, the system receives user input that is associated with a client device of a user. For instance, the user input can include typed or spoken input provided by a user of the client device (e.g., detected via the user input engine 111 of the client device 110). Put another way, the user input can be a natural language prompt or query.

At block 454, the system generates, based on processing at least the user input and using a GM, responsive content that is responsive to the user input. In generating the responsive content that is responsive to the user input, the system can cause the GM input engine 151 to determine GM input. The GM input can include the user input, and optionally other contextual information such as a dialog history of an ongoing dialog, system information associated with the system, client device information associated with the client device from which the user input was received, search result documents obtained using a retrieval augmented generation (RAG) process, etc. Further, the system can cause the GM processing engine 152 to process, using the GM, the GM input to generate GM output. The GM output can include, for example, a probability distribution over a sequence of tokens, such as a probability distribution over a sequence of word units, a sequence of words, a sequence of phrases, or other sequences of tokens. Moreover, the system can cause the GM output engine 153 to determine, based on the probability distribution over the sequence of tokens, the responsive content that is responsive to the user input. For example, the GM output engine 153 can select word units, word, phrases, or other tokens for inclusion in the responsive content based on the probability distribution over the sequence of tokens and using various decoding techniques (e.g., greedy decoding, beam decoding, sampling decoding, etc.).

At block 456, the system determines whether a corresponding segment of the responsive content matches a corresponding segment of opt-out content, the opt-out content being associated with a given user or given entity that has previously indicated a desire to opt-out of the GM being trained on data associated with the given user or the given entity. For example, the system can normalize the responsive content (e.g., in the same or similar manner described with respect to the operations of block 252 of the method 200 of FIG. 2). Further, the system can segment the responsive content (e.g., in the same or similar manner described with respect to the operations of blocks 254 and 256 of the method 200 of FIG. 2). In some implementations, the system can cause the attribution engine 160 to compare the normalized and segmented responsive content directly with the segment(s) stored in the opt-out database 140A (e.g., determined as described with respect to the method 300 of FIG. 3) to determine whether a corresponding segment of the responsive content matches a corresponding segment of opt-out content. In additional or alternative implementations, the system can cause the attribution engine 160 to generate, using a hash function, corresponding hashes for the responsive content and compare the corresponding hashes for the responsive to corresponding hashes for the opt-out content stored in the opt-out database 140A (e.g., determined as described with respect to the method 300 of FIG. 3) to determine whether a corresponding segment of the responsive content matches a corresponding segment of opt-out content. Determining whether a corresponding segment of the responsive content matches a corresponding segment of opt-out content is described in more detail herein (e.g., with respect to FIG. 5).

At block 458, if the system determines that a corresponding segment of the responsive content matches a corresponding segment of the opt-out content at block 456, then the system proceeds to block 460. At block 460, the system determines whether the corresponding segment of the opt-out content matches a corresponding segment of opt-in content, the opt-in content being associated with a given additional user or a given additional entity that has not previously indicated a desire to opt-out of the GM being trained on additional data associated with the given additional user or the given additional entity. In some implementations, the system can cause the attribution engine 160 to compare the normalized and segmented opt-out content directly with the segment(s) stored in the GM dataset index 130B (e.g., determined as described with respect to the method 200 of FIG. 2) to determine whether the corresponding segment of the opt-out content matches a corresponding segment of opt-in content. In additional or alternative implementations, the system can cause the attribution engine 160 to compare corresponding hashes for the opt-out content to corresponding hashes for the opt-in content stored in the GM dataset index 130B (e.g., determined as described with respect to the method 200 of FIG. 2) to determine whether the corresponding segment of the opt-out content matches a corresponding segment of opt-in content. Determining whether the corresponding segment of the opt-out content matches a corresponding segment of opt-in content is described in more detail herein (e.g., with respect to FIG. 5).

Put another way, if the system determines that the corresponding segment of the responsive content matches a corresponding segment of the opt-out content, then the system can attempt to determine if the corresponding segment of opt-out content matches other segment(s) of opt-in content. As noted herein, the GM dataset 130A includes enormous amounts of diverse data including data from, but not limited to, webpages, images, videos, electronic books, software code, electronic news articles, and machine translation data. As a result, there is a high likelihood that there is a corresponding segment of opt-in content that is the same as the corresponding segment of the opt-out content, but is associated with a different source that is opted-in as opposed to the given user or the given entity that has opted-out. As some non-limiting examples, different public domain books may include the same quotes from the same person, different media outlets may report the same facts about the same event, etc. Accordingly, in an attempt to refrain from having to modify the corresponding segment of the responsive content, the system can pivot to the opt-in content. However, it should be noted that a quantity of data included in the opt-out content database 140A is smaller relative to a quantity of data included in the GM dataset index 130B. Thus, the system can initially restrict a search space to the opt-out content database 140A since it can be more computationally efficient to determine whether the system even needs to search the GM dataset index 130B.

At block 462, if the system determines that the corresponding segment of the responsive content (e.g., that matched a corresponding segment of the opt-out content at block 456) does not match a corresponding segment of the opt-in content, then the system proceeds to block 464. At block 464, the system modifies the corresponding segment of the responsive content to generate modified responsive content. Modifying the corresponding segment of the responsive content to generate the modified responsive content is described in more detail herein (e.g., with respect to FIG. 6). At block 466, the system causes the modified responsive content, in lieu of the responsive content, to be rendered at the client device. The system can cause the modified responsive content to be visually rendered and/or audibly rendered via the client device from which the user input was received. Put another way, if the system determines that the corresponding segment of the responsive content matches a corresponding segment of the opt-out content but does not match a corresponding segment of the opt-in content, then the system can modify the corresponding segment of the responsive content to ensure that no data associated with the given user or the given entity is included in the modified responsive content.

At block 458, if the system determines that a corresponding segment of the responsive content does not match a corresponding segment of the opt-out content at block 456, then the system proceeds to block 468. Additionally, or alternatively, at block 462, if the system determines that the corresponding segment of the responsive content (e.g., that matched a corresponding segment of the opt-out content at block 456) does match a corresponding segment of the opt-in content, then the system proceeds to block 468. At block 468, the system refrains from modifying the corresponding segment of the responsive content. At block 470, the system causes the responsive content to be rendered at the client device. The system can cause the responsive content to be visually rendered and/or audibly rendered via the client device from which the user input was received.

Although the method 400 of FIG. 4 is described with respect to refraining from modifying the corresponding segment of the responsive content in implementations where the corresponding segment of the responsive content (e.g., that matched a corresponding segment of the opt-out content at block 456) matches a corresponding segment of the opt-in content, it should be understood that is for the sake of brevity and is not meant to be limiting. For instance, the system can optionally modify the corresponding segment of the responsive content in these implementations to attribute the corresponding segment of the responsive content to the given additional user or the given additional entity that is associated with the corresponding segment of the opt-in content.

Further, although the method 400 of FIG. 4 is described with respect to determining whether a corresponding segment of the responsive content matches a corresponding segment of opt-out content and/or a corresponding segment of opt-in content, it should be understood that is for the sake of brevity to illustrate techniques contemplated herein and is not meant to be limiting. For example, the system can run multiple instances of the method 400 or certain operations of the method 400, in parallel, to compare all of the corresponding segments of the responsive content to all of the corresponding segments of the opt-out content and/or the corresponding segments of opt-in content. As another example, the system can run multiple instances of the method 400 or certain operations of the method 400, in sequence, to compare all of the corresponding segments of the responsive content to all of the corresponding segments of the opt-out content and/or the corresponding segments of opt-in content.

Figure 5:
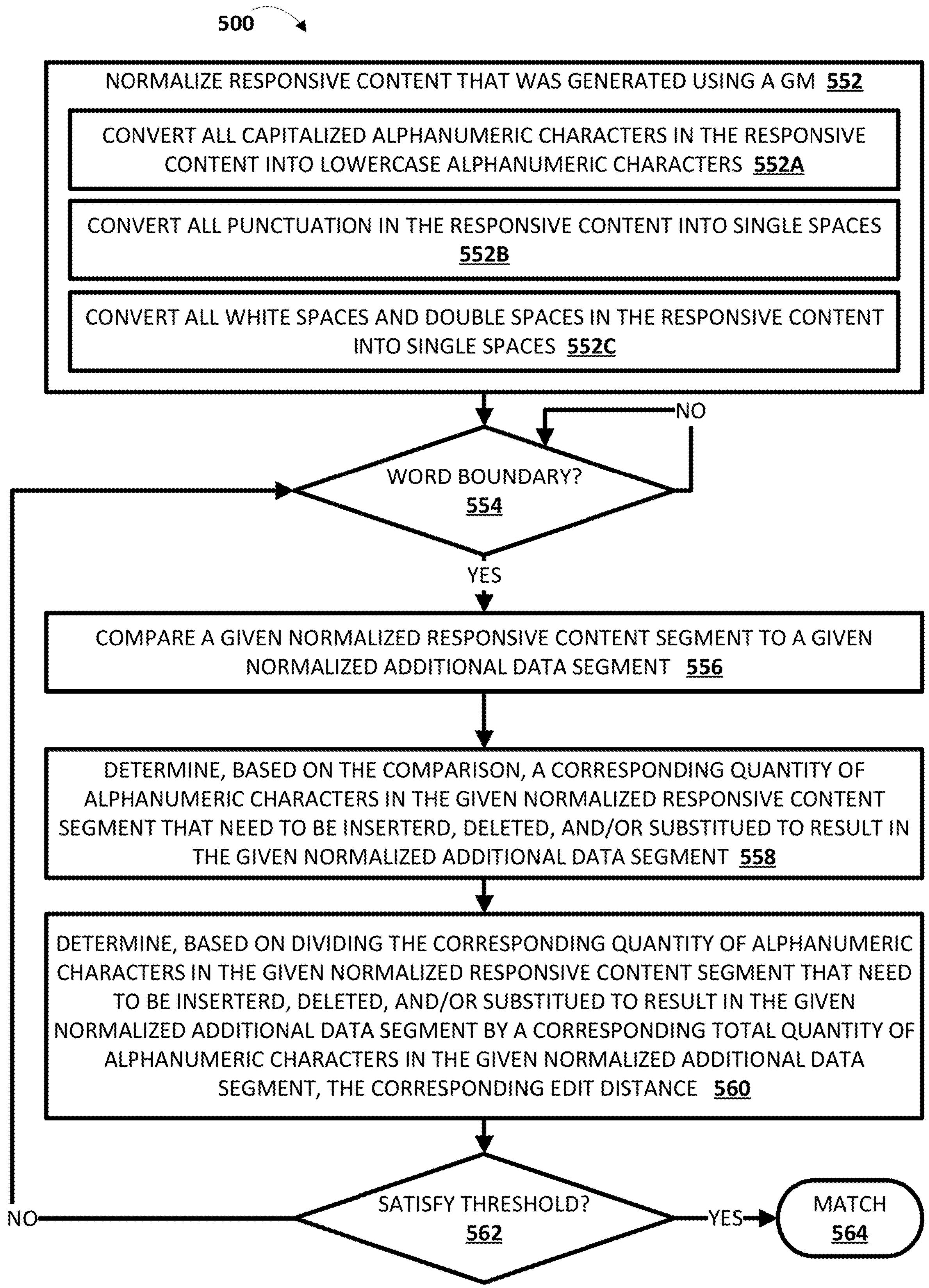
FIG. 5 depicts a flowchart illustrating an example method of determining a corresponding edit distance between a corresponding segment of responsive content generated using a GM and a corresponding segment of additional data, in accordance with various implementations.

Turning now to FIG. 5, a flowchart illustrating an example method 500 of determining a corresponding edit distance between a corresponding segment of responsive content generated using a GM and a corresponding segment of additional data is depicted. For convenience, the operations of the method 500 are described with reference to a system that performs the operations. This system of the method 500 includes one or more processors, memory, and/or other component(s) of computing device(s) (e.g., client device 110 of FIG. 1, GM responsive content system 120 of FIG. 1, computing device 810 of FIG. 8, one or more servers, and/or other computing devices). Moreover, while operations of the method 500 are shown in a particular order, this is not meant to be limiting. One or more operations may be reordered, omitted, and/or added.

At block 552, the system normalizes responsive content that was generated using a GM. The system can cause a normalization engine (e.g., the normalization engine 131 or an additional instance thereof) to process the responsive content using various normalization operations to normalize the responsive content. For example, at sub-block 552A, the normalization engine can convert all capitalized alphanumeric characters in the responsive content into lowercase alphanumeric characters. As another example, at sub-block 552B, the normalization engine can convert all punctuation in the responsive content into single spaces. As yet another example, at sub-block 552C, the normalization engine can convert all white spaces and double spaces in the responsive content into single spaces. Additional, or alternative, normalization operations are contemplated herein.

At block 554, the system processes alphanumeric characters of the normalized responsive content to identify a word boundary in the responsive content. The system can cause a segmentation engine (e.g., the segmentation engine 132 or an additional instance thereof) to identify the word boundaries in the normalized responsive content. Notably, the word boundary can include any string of alphanumeric characters in the normalized responsive content that defines a word. The segmentation engine can continually process the normalized responsive content to identify word boundaries. If, at an iteration of block 554, the system determines that no word boundary in the normalized responsive content has been identified, then the system continues processing the normalized responsive content to identify a word boundary at block 554. If, at an iteration of block 554, the system determines that a word boundary has been identified, then the system proceeds to block 556.

At block 556, the system compares a given normalized responsive content segment to a given normalized additional data segment. At block 558, the system determines, based on the comparison, a corresponding quantity of alphanumeric characters in the given normalized responsive content segment that need to be inserted, deleted, and/or substituted to result in the given normalized additional data segment. At block 560, the system determines, based on dividing the corresponding quantity of alphanumeric characters in the given normalized responsive content segment that need to be inserted, deleted, and/or substituted to result in the given normalized additional data segment by a corresponding total quantity of alphanumeric characters in the given normalized additional data segment, the corresponding edit distance.

Notably, the additional data can include, for example, any out-out content (e.g., stored in the opt-out content database 140A), any opt-in content (e.g., stored in the GM dataset index 130B), and/or any other data that is in addition to data included in the responsive content. Put another way, the method 500 of FIG. 5 can be utilized to determine whether a corresponding segment of the responsive content matches a corresponding segment of opt-out content as described with respect to the operations of block 456 of the method 400 of FIG. 4, to determine whether a corresponding segment of the responsive content matches a corresponding segment of opt-in content as described with respect to the operations of block 460 of the method 400 of FIG. 4, and/or to perform other similar determinations described herein.

For example, the system can cause the attribution engine 160 to compare the given normalized responsive content segment to the given normalized additional data segment on an alphanumeric character by alphanumeric character basis. Based on comparing the given normalized responsive content segment to the given normalized additional data segment on the alphanumeric character by alphanumeric character basis, the comparison engine can determine the corresponding quantity of alphanumeric characters in the given normalized responsive content segment that need to be inserted, deleted, and/or substituted to result in the given normalized additional data segment.

For instance, assume that the given normalized additional data segment is "organize the worlds information and make it universally accessible and useful". Further assume that the given normalized responsive content segment is "organize the worlds information and make it universally accessible and useful". In this instance, the corresponding total quantity of alphanumeric characters in the given normalized additional data segment is 80, but no alphanumeric characters in the given normalized responsive content segment that need to be inserted, deleted, and/or substituted to result in the given normalized additional data segment. Accordingly, the corresponding edit distance is 0.0 and the given normalized responsive content segment is an exact match to the given normalized additional data segment.

Also, for instance, again assume that the given normalized additional data segment is "organize the worlds information and make it universally accessible and useful". However, assume that the given normalized responsive content segment is "organizing the worlds information and make it universally accessible and useful". In this instance, the corresponding total quantity of alphanumeric characters in the given normalized additional data segment is still 80, but 3 alphanumeric characters in the given normalized responsive content segment that need to be inserted, deleted, and/or substituted to result in the given normalized additional data segment (e.g., the difference between "organize" and "organizing" for substituting "e" with "ing"). Accordingly, the corresponding edit distance is 0.0375 (e.g., the 3 alphanumeric characters in the given normalized responsive content segment that need to be substituted divided by the 80 total alphanumeric characters in the given normalized additional data segment).

At block 562, the system determines whether the corresponding edit distance between the given normalized responsive content segment and the given normalized additional data segment satisfies an edit distance threshold. The system can cause the comparison engine 153 to compare the corresponding edit distance to the edit distance threshold to determine whether the corresponding edit distance satisfies the edit distance threshold. The edit distance threshold can be, for example, a tunable parameter that is tunable by a developer associated with the system.

If, at an iteration of block 562, the system determines that the corresponding edit distance between the given normalized responsive content segment and the given normalized additional data segment fails to satisfy the edit distance threshold, then the system returns to block 554 to continue with an additional iteration of the method 500 of FIG. 5. For instance, the system can continue identifying word boundaries and comparing respective instances of the normalized responsive content segments with respective instances of the normalized additional data segments to determine whether they match. Notably multiple instances of the operations of blocks 554-562 can be performed in a parallel manner, in a sequential manner, and/or in a combination of a parallel manner and sequential manner.

If, at an iteration of block 562, the system determines that the corresponding edit distance between the given normalized responsive content segment and the given normalized additional data segment satisfies the edit distance threshold, then the system determines that the given normalized responsive content segment matches the given normalized additional data segment as indicated at 564.

Although the method 500 of FIG. 5 is described with respect to determining whether a corresponding segment of the responsive content matches a corresponding segment of the additional data based on the corresponding edit distance therebetween, it should be understood that is for the sake of example and is not meant to be limiting. For example, in additional or alternative implementations, the system can process, using a hash function, the normalized and segmented responsive content to generate corresponding hashes for the responsive content, and compare the corresponding hashes for the responsive content to corresponding hashes for the additional data (e.g., that were previously generated and stored in the boilerplate language data database 140A, in the GM dataset index 130B, etc.). While the corresponding hashes enable quick and efficient comparison of these segments (e.g., relative to comparing raw strings), utilizing the corresponding hashes may not enable the system to account for minimal differences between the corresponding segments that can be accounted for using the corresponding edit distance as described herein.

Figure 6:
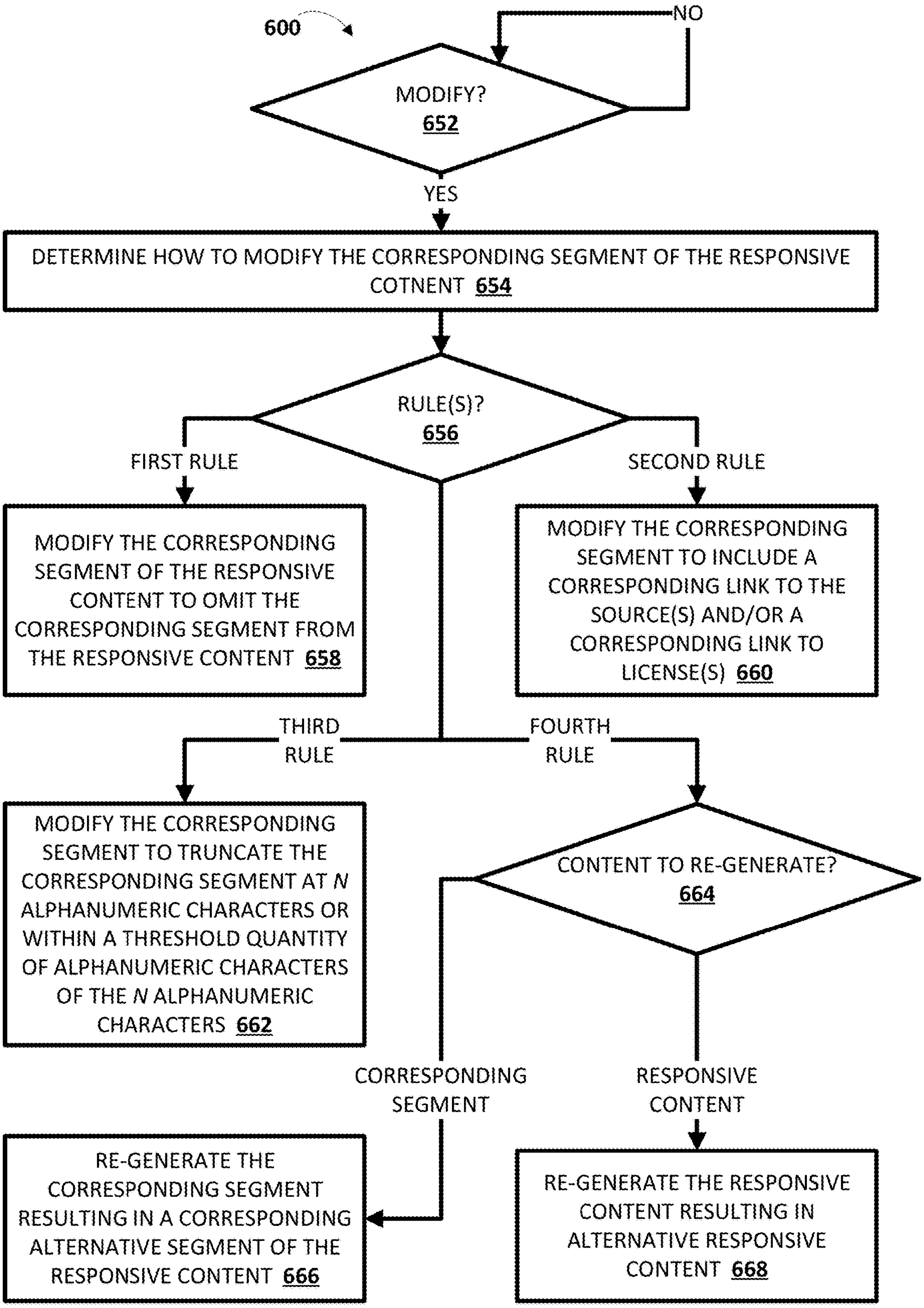
FIG. 6 depicts a flowchart illustrating an example method of determining how to modify a corresponding segment of responsive content generated using a GM, in accordance with various implementations.

Turning now to FIG. 6, a flowchart illustrating an example method 600 of determining how to modify a corresponding segment of responsive generated using a GM is depicted. For convenience, the operations of the method 600 are described with reference to a system that performs the operations. This system of the method 600 includes one or more processors, memory, and/or other component(s) of computing device(s) (e.g., client device 110 of FIG. 1, GM responsive content system 120 of FIG. 1, computing device 810 of FIG. 8, one or more servers, and/or other computing devices). Moreover, while operations of the method 600 are shown in a particular order, this is not meant to be limiting. One or more operations may be reordered, omitted, and/or added.

At block 652, the system determines whether to modify a corresponding segment of responsive content that matches a corresponding segment of non-boilerplate language data. The system can determine whether to modify a corresponding segment of responsive content that matches a corresponding segment of opt-out content at the operations of block 456 of the method 400 of FIG. 4, but does not match a corresponding segment of opt-in content at the operations of block 460 of the method of FIG. 4. Additionally, or alternatively, the system can determine whether to modify a corresponding segment of responsive content that matches a corresponding segment of opt-out content at the operations of block 456 of the method 400 of FIG. 4, and matches a corresponding segment of opt-in content at the operations of block 460 of the method of FIG. 4. If, at an iteration of block 652, the system determines not to modify the corresponding segment of the responsive content at an iteration of the method 600 of FIG. 6, then the system continues monitoring for whether to modify the corresponding segment of the responsive content and/or whether to modify additional segment(s) of the responsive content.

If, at an iteration of block 652, the system determines to modify the corresponding segment of the responsive content, then the system proceeds to block 654. At block 654, the system determines how to modify the corresponding segment of the responsive content. At block 656, the system determines one or more rules to apply to at least the corresponding segment of the responsive content and based on the determination at block 654 for how to modify the corresponding segment of the responsive content. For example, the system can cause the rules engine 171 to determine the one or more rules to apply to the corresponding segment of the responsive content. Further, the system can cause the modification engine 172 to modify, based on the one or more rules, the corresponding segment of the responsive content. Notably, the rules engine 171 can determine which rule to apply based on, for instance, whether the corresponding segment of the responsive content matches a corresponding segment of opt-out content, whether the corresponding segment of the responsive content matches a corresponding segment of non-opt-out content, and/or based on other factors.

For instance, in some implementations where the system determines a corresponding segment of responsive content matches a corresponding segment of opt-out content at the operations of block 456 of the method 400 of FIG. 4, but does not match a corresponding segment of opt-in content at the operations of block 460 of the method of FIG. 4, the rules engine 171 can determine to proceed to block 658 to cause a first rule to be applied. At block 658, the system can cause the modification engine 172 to modify the corresponding segment of the responsive content to omit the corresponding segment from the responsive content. Put another way, the modification engine 172 can remove the alphanumeric characters of the responsive content that include the opt-out content to generate the modified responsive content. However, in additional or alternative implementations, and as described with respect to the method 400 of FIG. 4, the system can determine whether the corresponding segment of the opt-out content matches a corresponding segment of opt-in content prior to modifying the segment of the responsive content to omit the corresponding segment from the responsive content.

Further, in some implementations where the system determines a corresponding segment of responsive content matches a corresponding segment of opt-in content at the operations of block 460 of the method 400 of FIG. 4 (and optionally that matches a corresponding segment of opt-out content at the operations of block 456 of the method 400 of FIG. 4), the rules engine 171 can determine to proceed to block 660 to cause a second rule to be applied. At block 660, the system can cause the modification engine 172 to modify the corresponding segment of the responsive content to include a corresponding link to source(s) associated with the opt-in content and/or a corresponding link to license(s) associated with the opt-in content. Put another way, the modification engine 172 can attribute the segment(s) of the responsive content that match opt-in content to source(s) thereof (and license(s) where appropriate) to generate the modified responsive content.

Notably, a type of the source(s) can be, for example, webpages (e.g., public domain webpages, licensed webpages, non-public domain webpages, and/or other webpages), electronic books (e.g., public domain electronic books and/or non-public domain electronic books), electronic documents (e.g., electronic word processing documents, electronic PDFs, etc.), electronic communications (e.g., electronic mail, SMS messages, social media posts or messages), software code (e.g., public domain software code, licensed software code, and/or non-public domain software code), electronic news articles, mathematical formulas, machine translation data, and/or any other data from any other source that is included in a plurality of search result documents (e.g., obtained using a RAG process and processed in generating the responsive content) and/or that was utilized to train and/or fine-tune the GM. Whether the modification engine 172 includes the corresponding link to the license(s) associated with the source(s) can be based on the type of the source(s) associated with the corresponding segment of the responsive content. Additionally, or alternatively, the system can consider an extent to which a corresponding segment of non-boilerplate language data matches a corresponding segment of the responsive content in determining one or more of the rules to be applied to a corresponding segment of the responsive content.

Moreover, in additional or alternative implementations where the system determines a corresponding segment of responsive content matches a corresponding segment of opt-in content at the operations of block 460 of the method 400 of FIG. 4 (and optionally that matches a corresponding segment of opt-out content at the operations of block 456 of the method 400 of FIG. 4), the rules engine 171 can determine to proceed to block 662 to cause a third rule to be applied. At block 662, the system can cause the modification engine 172 to modify the corresponding segment of the responsive content to truncate the corresponding segment at N alphanumeric characters or within a threshold quantity of alphanumeric characters of the N alphanumeric characters, where N is a positive integer. For example, in response to determining that one or more of the sources include a corresponding non-public domain webpage, a corresponding non-public domain electronic book, or corresponding non-public domain software code, etc., the rules engine 171 can determine to truncate the corresponding segment at 100 alphanumeric characters, 200 alphanumeric characters, 300 alphanumeric characters, or at any other N alphanumeric characters. Put another way, the modification engine 172 can remove all alphanumeric characters in the corresponding segment beyond the N alphanumeric character, remove all alphanumeric characters in the corresponding segment beyond the N alphanumeric characters and remove all alphanumeric characters prior to the N alphanumeric characters before the last sentence break or some other threshold quantity of alphanumeric characters before the N alphanumeric characters.

Furthermore, in additional or alternative implementations where the system determines a corresponding segment of responsive content matches a corresponding segment of opt-in content at the operations of block 460 of the method 400 of FIG. 4 (and optionally that matches a corresponding segment of opt-out content at the operations of block 456 of the method 400 of FIG. 4), the rules engine 171 can determine to proceed to block 664 to cause a fourth rule to be applied. At block 664, the system can cause the modification engine 172 to determine whether to re-generate the corresponding segment of the responsive content (e.g., only the corresponding segment of the responsive content) or the responsive content (e.g., the responsive content in its entirety). Notably, whether the system proceeds to block 666 or 668 and from block 664 can also be defined by the developer associated with the system.

If, at an iteration of 664, the system determines to re-generate the corresponding segment of the responsive content, then the system proceeds to block 666. At block 666, the system re-generates the corresponding segment resulting in a corresponding alternative segment of the responsive content. In re-generating the corresponding segment, the system can cause the GM input engine 151 to determine alternative GM input. The alternative GM input can include, for example, the user input, other segments of the responsive content (e.g., other than the corresponding segment that is being modified), an indication to bias away from the corresponding segment in re-generating the corresponding segment, and/or other information. Further, the system can cause the GM processing engine 152 to process, using the GM, the alternative GM input to generate alternative GM output. Moreover, the system can cause the GM output engine 153 to determine, based on the alternative GM output, the corresponding alternative segment of the responsive content.

If, at an iteration of 664, the system determines to re-generate the responsive content, then the system proceeds to block 668. At block 668, the system re-generates the responsive content resulting in alternative responsive content. In re-generating the corresponding segment, the system can cause the GM input engine 151 to determine alternative GM input. The alternative GM input can include, for example, the user input, the responsive content, an indication to bias away from the corresponding segment in re-generating the responsive content, and/or other information. Further, the system can cause the GM processing engine 152 to process, using the GM, the alternative GM input to generate alternative GM output. Moreover, the system can cause the GM output engine 153 to determine, based on the alternative GM output, the alternative segment content.

Notably, and prior to performing the operations of block 666 or block 668, the system can modify tunable parameters of the GM and/or various engines described herein. For example, the system can modify a temperature parameter of the GM prior to re-generating the corresponding segment or re-generating the responsive content. As another example, the system can modify a decoding technique utilized by the GM output engine 153.

Although certain rules for certain sources are described above, it should be understood that is for the sake of example to illustrate various techniques contemplated herein and is not meant to be limiting. For example, if a corresponding segment of the responsive content includes more than N alphanumeric characters that match a corresponding segment of the opt-in content, but less than M alphanumeric characters that match a corresponding segment of the opt-in content (e.g., where N and M are positive integers, and where M is greater than N), then the system can determine to modify the corresponding segment of the responsive content as described with respect to the operations of block 658 or block 660. However, and continuing with the above example, if the corresponding segment of the responsive content responsive content includes more than M alphanumeric characters that match a corresponding segment of the opt-in content, then the system can truncate the corresponding segment at the M alphanumeric characters (or within a threshold of the M alphanumeric characters). In this example, the system can determine to modify the corresponding segment of the responsive content as described with respect to the operations of block 658 or block 660, and the system can optionally insert an ellipsis into the corresponding segment of the responsive content. In causing the modified responsive content to be rendered, the system can output a first version of the modified responsive content that omits the ellipsis and a second version of the modified responsive that includes the ellipsis, thereby enabling a user associated with the client device to choose the first version of the modified responsive content or the second version of the modified responsive content. This can be particularly advantageous in certain scenarios, such as when the modified responsive content is generative software code since the ellipsis may not be desirable in the generative software code, but may be desirable in generative text.

Figure 7A:
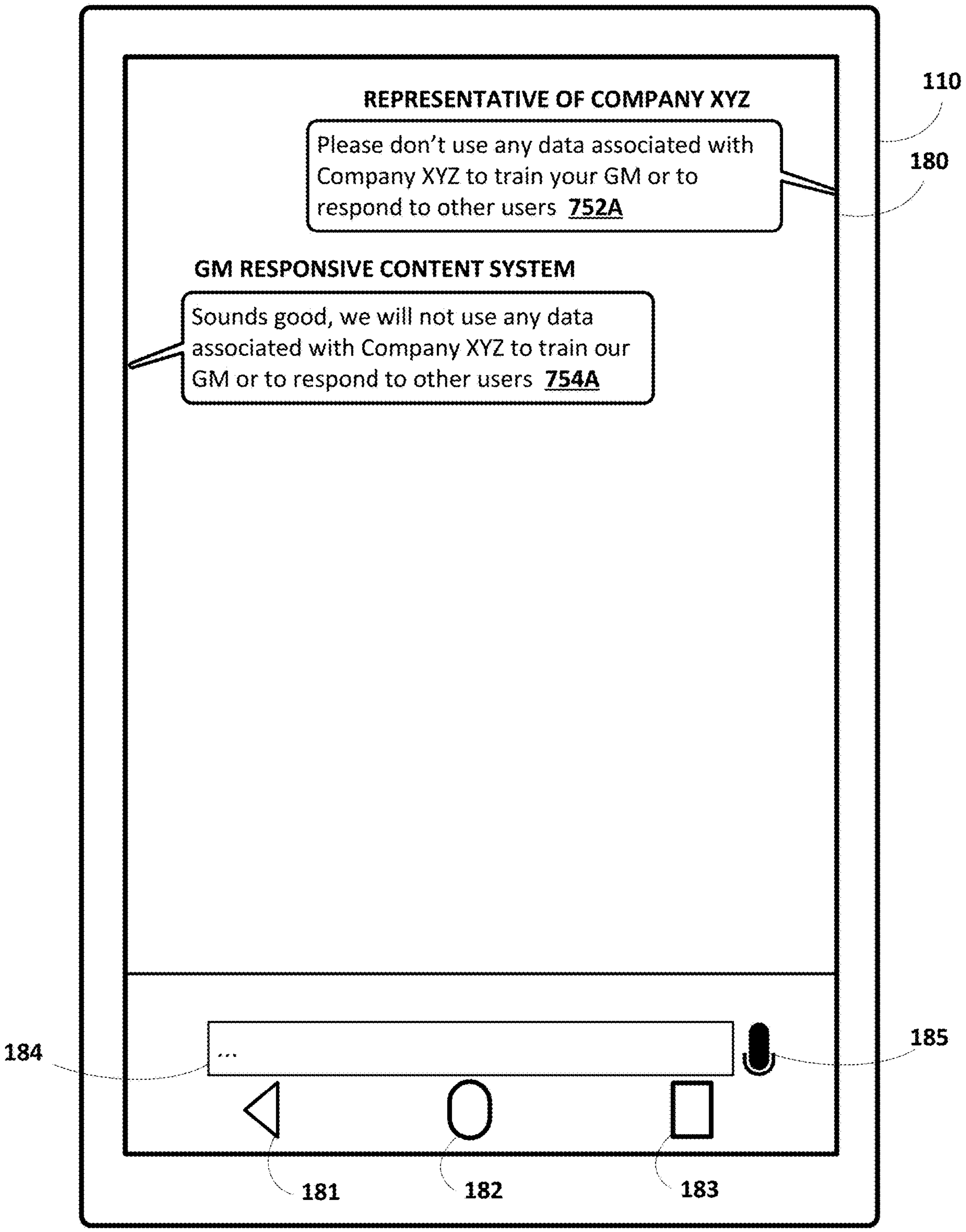
FIG. 7A and FIG. 7B depict a non-limiting example of a client device rendering responsive content generated using a GM, in accordance with various implementations.
Figure 7B:
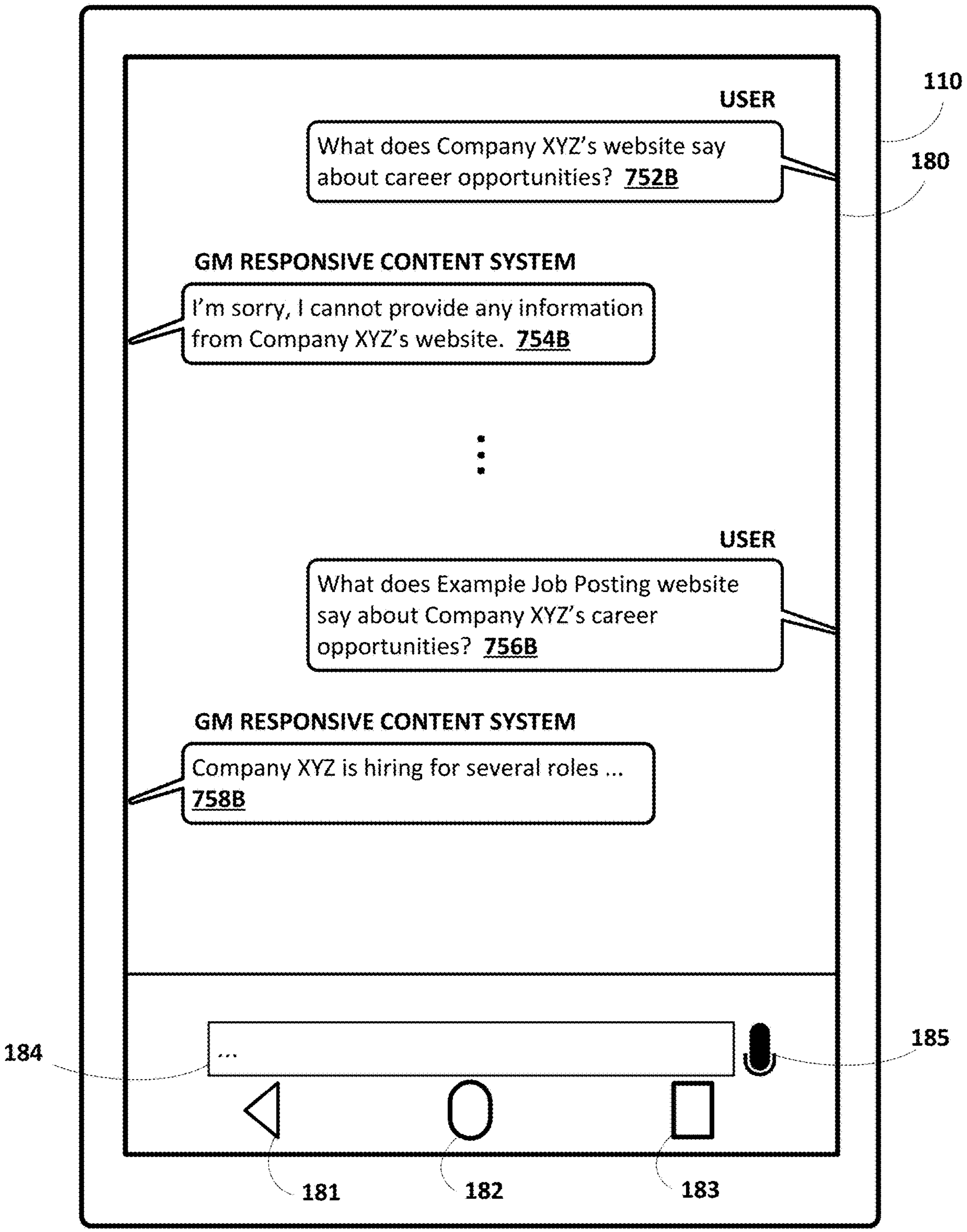

Turning now to FIG. 7A and FIG. 7B, non-limiting examples of a client device rendering responsive content generated using a GM are depicted. A client device 110 may include various user interface components including, for example, microphone(s) to generate audio data based on spoken utterances and/or other audible input, speaker(s) to audibly render synthesized speech and/or other audible output, and/or a display 180 to visually render visual output. Further, the display 180 of the client device 110 can include various system interface elements 181, 182, and 183 (e.g., hardware and/or software interface elements) that may be interacted with by a user of the client device 110 to cause the client device 110 to perform one or more actions. The display 180 of the client device 110 enables the user to interact with content rendered on the display 180 by touch input (e.g., by directing user input to the display 180 or portions thereof (e.g., to a text entry box 184, to a keyboard (not depicted), or to other portions of the display 180)) and/or by spoken input (e.g., by selecting microphone interface element 185—or just by speaking without necessarily selecting the microphone interface element 185 (i.e., an automated assistant may monitor for one or more terms or phrases, gesture(s) gaze(s), mouth movement(s), lip movement(s), and/or other conditions to activate spoken input) at the client device 110). Although the client device 110 depicted in FIG. 7A and FIG. 7B is a mobile phone, it should be understood that is for the sake of example and is not meant to be limiting. For example, the client device 110 may be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 110.

For the sake of example, and referring specifically to FIG. 7A, assume that a user of a client device 110 (e.g., an instance of the client device 110 from FIG. 1) is interacting with a GM responsive content system (e.g., the GM responsive content system 120 of FIG. 1) on behalf of Company XYZ (a fictitious entity), and assume that the user provides user input 752A of "Please don't use any data associated with Company XYZ to train your GM or to respond to other users". The user of the client device 110 can interact with the GM responsive content system using an automated assistant that is implemented at least in part by the client device 110, a software application that is accessible at the client device 110, a web browser that is accessible by the client device 110, and/or by other means. Further assume that the GM responsive content system generates responsive content 754A, that is responsive to the user input 752A, based on processing at least the user input 752A. As shown in FIG. 7A, the responsive content 754A that is rendered can include "Sounds good, we will not use any data associated with Company XYZ to train our GM or to respond to other users". However, the GM responsive content system can also determine that the user input 752A also indicates a desire to opt-out. Accordingly, and based on receiving the user input 752A, the system can determine opt-out content for Company XYZ (e.g., as described with respect to the method 300 of FIG. 3).

Further, and referring specifically to FIG. 7B, assume that an additional user of a client device 110 (e.g., an additional instance of the client device 110 from FIG. 1) is interacting with a GM responsive content system (e.g., the GM responsive content system 120 of FIG. 1), and assume that the additional user provides user input 752B of "What does Company XYZ's website say about career opportunities?". Notably, in this example, the user is explicitly requesting information from Company XYZ's website, and the GM responsive content system can utilize the search system(s) 190 (e.g., via a RAG process) to obtain portion(s) of Company XYZ's website that can be utilized in responding to the user input 752B. However, and as described with the respect to FIG. 7A, Company XYZ may have opted-out of the GM responsive content system being able to utilize Company XYZ's content in responding to users. Accordingly, in this example, the GM responsive content system can generate responsive content 754B of "I'm sorry, I cannot provide any information from Company XYZ's website" and cause the responsive content 754B to be rendered at the client device 110. However, although Company XYZ previously indicated a desire to opt-out, other users and/or entities that are opted-in may be associated with opt-in content that is responsive to the user input 752B.

For instance, assume that the additional user of the client device 110 is interacting with the GM responsive content system, and assume that the additional user provides user input 756B of "What does Example Job Posting website say about Company XYZ's career opportunities?". Notably, in this instance, the user is explicitly requesting information from Example Job Posting's website (instead of Company XYZ's website), and the GM responsive content system can utilize the search system(s) 190 (e.g., via a RAG process) to obtain portion(s) of Example Job Posting's website that can be utilized in responding to the user input 756B. Further assume that Example Job Posting has not opted-out of the GM responsive content system being able to utilize Example Job Posting's content in responding to users. Accordingly, in this example, the GM responsive content system can generate responsive content 758B of "Company XYZ is hiring for several roles . . . " (and optionally along with a corresponding link to Example Job Posting's website) and cause the responsive content 758B to be rendered at the client device 110. Notably, the content of the job postings for Company XYZ on Example Job Posting's website may be the same or substantially similar to the job postings on Company XYZ's website and can be included in the responsive content 758B since Example Job Posting has not opted-out.

Although the example of FIG. 7B is described with respect to the user inputs requesting information from particular sources (e.g., Company XYZ's website in the user input 752B and Example Job Posting's website in the user input 756B), it should be understood that is for the sake of illustrating various techniques contemplated herein and is not meant to be limiting. For instance, had the user inputs not specified the particular sources, the GM responsive content system could determine that Company XYZ has opted-out in response to receiving the user input 752B and could have pivoted to relying on opt-in content from Example Job Posting's website.

Figure 8:
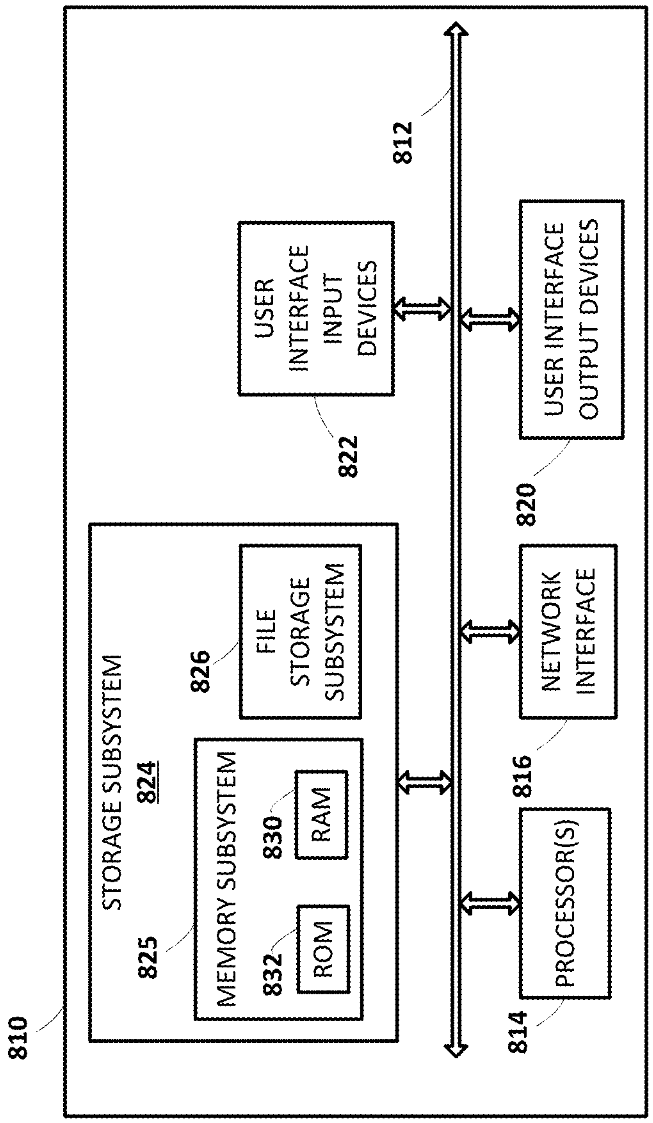
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a system is provided that includes at least one processor; and memory storing instructions that, when executed by the at least one processor, cause the at least one processor to be operable to: receive user input that is associated with a client device of a user; generate, based on processing at least the user input and using a generative model (GM), responsive content that is responsive to the user input; determine whether a corresponding segment of the responsive content matches a corresponding segment of opt-out content, the opt-out content being associated with a given user or a given entity that has opted-out of: the GM being trained on data, that is associated with the given user or the given entity, since a last training cycle for the GM, or the GM being able to use the data, that is associated with the given user or the given entity, in generating the responsive content; and in response to determining that a corresponding segment of the responsive content matches a corresponding segment of the opt-out content: modify the corresponding segment of the responsive content to generate modified responsive content; and cause the modified responsive content, in lieu of the responsive content, to be rendered at the client device of the user.

These and other implementations of technology disclosed herein can optionally include one or more of the following features.

In some implementations, the at least one processor can be further operable to: receive, from the given user or the given entity, an indication that the given user or the given entity desires to opt-out of the GM being trained on the data or the GM being able to use the data in generating the responsive content; and in response to receiving the indication that the given user or the given entity desires to opt-out of the GM being trained on the data or the GM being able to use the data in generating the responsive content: determine, for the given user or the given entity, the opt-out content; and store, in one or more databases, the opt-out content.

In some versions of those implementations, the instructions to determine the opt-out content for the given user or the given entity can include instructions to: identify content that is associated with the given user or the given entity; normalize, using one or more normalization operations, the content that is associated with the given user or the given entity to generate normalized content; segment the normalized content into a plurality of normalized content segments; and store, in one or more of the databases, the plurality of normalized content segments as the opt-out content.

In some further versions of those implementations, the at least one processor can be further operable to: normalize, using the one or more normalization operations, the responsive content to generate normalized responsive content; and segment the normalized responsive content into a plurality of normalized responsive content segments.

In some yet further versions of those implementations, the instructions to determine whether a corresponding segment of the responsive content matches a corresponding segment of the opt-out content can include instructions to: determine, based on a comparison of the plurality of normalized content segments to the plurality of normalized responsive content segments, whether a corresponding segment of the responsive content matches a corresponding segment of the opt-out content.

In some even yet further versions of those implementations, the instructions to determine whether a corresponding segment of the responsive content matches a corresponding segment of the opt-out content based on the comparison of the plurality of normalized content segments to the plurality of normalized responsive content segments can include instructions to: determine a corresponding quantity of alphanumeric characters in a normalized instance of the corresponding segment of the responsive content that need to be inserted, deleted, and/or substituted to result in a normalized instance the corresponding segment of the content; determine a corresponding edit distance between the corresponding segment of the responsive content and the corresponding segment of the content as a function of (a) the corresponding quantity of alphanumeric characters in the normalized instance of the corresponding segment of the responsive content that need to be inserted, deleted, and/or substituted to result in the normalized instance the corresponding segment of the content; and (b) a corresponding total quantity of alphanumeric characters in the normalized instance of the corresponding segment of the content; and in response to determining that the corresponding edit distance between the corresponding segment of the responsive content and the corresponding segment of the content satisfies an edit distance threshold: determine that a corresponding segment of the responsive content matches a corresponding segment of the opt-out content.

In additional or alternative further versions of those implementations, the plurality of normalized content segments can be stored in one or more of the databases as the opt-out content prior to the user input being received, and wherein the responsive content is normalized and segmented subsequent to the responsive content being generated.

In additional or alternative versions of those implementations, the instructions to determine the opt-out content for the given user or the given entity can include instructions to: identify content that is associated with the given user or the given entity; process, using a hash function, the content that is associated with the given user or the given entity to generate a plurality of corresponding hashes for the content; and store, in one or more of the databases, the plurality of corresponding hashes for the content as the opt-out content.

In some further versions of those implementations, the at least one processor can be further operable to, prior to processing the content that is associated with the given user or the given entity to generate the plurality of corresponding hashes for the content and using the hash function: normalize, using one or more normalization operations, the content that is associated with the given user or the given entity to generate normalized content; and segment the normalized content into a plurality of normalized content segments. The instructions to process the content that is associated with the given user or the given entity to generate the plurality of corresponding hashes for the content and using the hash function can include instructions to process, using the hash function, the plurality of normalized content segments to generate the plurality of corresponding hashes for the content as the opt-out content.

In additional or alternative further versions of those implementations, the at least one processor can be further operable to: process, using the hash function, the responsive content to generate a plurality of corresponding hashes for the responsive content.

In some even yet further versions of those implementations, the at least one processor can be further operable to, prior to processing the responsive content to generate the plurality of corresponding hashes for the responsive content and using the hash function: normalize, using the one or more normalization operations, the responsive content to generate normalized responsive content; and segment the normalized responsive content into a plurality of normalized responsive content segments. The instructions to process the responsive content to generate the plurality of corresponding hashes for the responsive content and using the hash function can include instructions to: process, using the hash function, the plurality of normalized responsive content segments to generate the plurality of corresponding hashes for the responsive content.

In additional or alternative even yet further versions of those implementations, the instructions to determine whether a corresponding segment of the responsive content matches a corresponding segment of the opt-out content can include instructions to: determine, based on a comparison the plurality of corresponding hashes for the content to the plurality of corresponding segments for the responsive content, whether a corresponding segment of the responsive content matches a corresponding segment of the opt-out content.

In additional or alternative even yet further versions of those implementations, the plurality of corresponding hashes for the content can be stored in one or more of the databases as the opt-out content prior to the user input being received, and the plurality of corresponding hashes for the responsive content can be generated subsequent to the responsive content being generated.

In some implementations, the at least one processor can be further operable to: determine, based on the user input, one or more search queries; and obtain, based on the one or more search queries, a plurality of search result documents. One or more of the plurality of search result documents can be processed along with the user input and using the GM to generate the responsive content that is responsive to the GM.

In some versions of those implementations, the at least one processor can be further operable to: determine whether one or more of the search result documents are associated with the given user or the given entity that has opted-out of the GM being trained on the data or the GM being able to use the data in generating the responsive content; and in response to determining that one or more of the search result documents are associated with the given user or the given entity that has opted-out of the GM being trained on the data or the GM being able to use the data in generating the responsive content: classify the one or more of the search result documents that are associated with the given user or the given entity as the opt-out content.

In some further versions of those implementations, the at least one processor can be further operable to: normalize, using one or more normalization operations, the one or more of the search result documents that are associated with the given user or the given entity to generate normalized content; and segment the normalized content into a plurality of normalized content segments.

In some even yet further versions of those implementations, the at least one processor can be further operable to: normalize, using the one or more normalization operations, the responsive content to generate normalized responsive content; and segment the normalized responsive content into a plurality of normalized responsive content segments.

In some even yet further versions of those implementations, the instructions to determine whether a corresponding segment of the responsive content matches a corresponding segment of the opt-out content can include instructions to: determine, based on a comparison of the plurality of normalized content segments to the plurality of normalized responsive content segments, whether a corresponding segment of the responsive content matches a corresponding segment of the opt-out content.

In some even yet further versions of those implementations, the instructions to determine whether a corresponding segment of the responsive content matches a corresponding segment of the opt-out content based on the comparison of the plurality of normalized content segments to the plurality of normalized responsive content segments can include instructions to: determine a corresponding quantity of alphanumeric characters in a normalized instance of the corresponding segment of the responsive content that need to be inserted, deleted, and/or substituted to result in a normalized instance the corresponding segment of the content; determine a corresponding edit distance between the corresponding segment of the responsive content and the corresponding segment of the content as a function of (a) the corresponding quantity of alphanumeric characters in the normalized instance of the corresponding segment of the responsive content that need to be inserted, deleted, and/or substituted to result in the normalized instance the corresponding segment of the content; and (b) a corresponding total quantity of alphanumeric characters in the normalized instance of the corresponding segment of the content; and in response to determining that the corresponding edit distance between the corresponding segment of the responsive content and the corresponding segment of the content satisfies an edit distance threshold: determine that a corresponding segment of the responsive content matches a corresponding segment of the opt-out content.

In additional or alternative further versions of those implementations, the at least one processor can be further operable to: process, using a hash function, the one or more of the search result documents that are associated with the given user or the given entity to generate a plurality of corresponding hashes for the content.

In even further versions of those implementations, the at least one processor can be further operable to, prior to processing the one or more of the search result documents that are associated with the given user or the given entity to generate the plurality of corresponding hashes for the content and using the hash function: normalize, using one or more normalization operations, the one or more of the search result documents that are associated with the given user or the given entity to generate normalized content; and segment the normalized content into a plurality of normalized content segments. The instructions to process the content that is associated with the given user or the given entity to generate the plurality of corresponding hashes for the content and using the hash function can include instructions to: process, using the hash function, the plurality of normalized content segments to generate the plurality of corresponding hashes for the content as the opt-out content.

In additional or alternative even further versions of those implementations, the at least one processor is further operable to: process, using the hash function, the responsive content to generate a plurality of corresponding hashes for the responsive content.

In even yet further versions of those implementations, the at least one processor can be further operable to, prior to processing the responsive content to generate the plurality of corresponding hashes for the responsive content and using the hash function: normalize, using the one or more normalization operations, the responsive content to generate normalized responsive content; and segment the normalized responsive content into a plurality of normalized responsive content segments. The instructions to process the responsive content to generate the plurality of corresponding hashes for the responsive content and using the hash function can include instructions to: process, using the hash function, the plurality of normalized responsive content segments to generate the plurality of corresponding hashes for the responsive content.

In additional or alternative even yet further versions of those implementations, the instructions to determine whether a corresponding segment of the responsive content matches a corresponding segment of the opt-out content can include instructions to: determine, based on a comparison the plurality of corresponding hashes for the content to the plurality of corresponding segments for the responsive content, whether a corresponding segment of the responsive content matches a corresponding segment of the opt-out content.

In some implementations, the instructions to modify the corresponding segment of the responsive content to generate modified responsive content can include instructions to: truncate the corresponding segment of the responsive content at N alphanumeric characters to generate the modified responsive content, wherein N is a positive integer greater than one.

In some implementations, the instructions to modify the corresponding segment of the responsive content to generate modified responsive content can include instructions to: omit the corresponding segment of the responsive content to generate the modified responsive content.

In some implementations, the instructions to modify the corresponding segment of the responsive content to generate modified responsive content can include instructions to: generate, based on processing at least the user input and the responsive content and using the GM, the modified responsive content that is responsive to the user input and that differs from the responsive content.

In some versions of those implementations, the at least one processor can be further operable to, prior to generating the modified responsive content that is responsive to the user input and that differs from the responsive content: modify one or more tunable parameters of the GM.

In some implementations, the at least one processor can be further operable to, in response to determining that no corresponding segment of the responsive content matches a corresponding segment of the opt-out content: cause the responsive content to be rendered at the client device of the user.

In some versions of those implementations, the instructions to cause the responsive content to be rendered at the client device of the user can be executed in response to determining that no corresponding segment of the responsive content matches a corresponding segment of a GM training dataset that was utilized to train the GM.

In some implementations, the given user of the given entity, prior to the last training cycle for the GM, may have been opted-in to allow the GM to be trained or the data and/or may have been opted-in to allow the GM to be able to use the data in generating the responsive content.

In some implementations, the at least one processor can be further operable to, prior to a next training cycle of the GM: cause the data that is associated with the given user or the given entity to be removed from a GM training dataset that will be utilized to train the GM.

In some implementations, the instructions to cause the modified responsive content to be rendered at the client device of the user can include instructions to: transmit data indicative of the modified responsive content to the client device. Transmitting the data indicative of the modified responsive content to the client device can cause the client device to visually render the modified responsive content via a display of the client device and/or audibly render the modified responsive content via one or more speakers of the client device.

In some implementations, the instructions to cause the modified responsive content to be rendered at the client device of the user can include instructions to: cause the modified responsive content to be visually rendered via a display of the client device and/or audibly rendered via one or more speakers of the client device.

In some implementations, in response to determining that a corresponding segment of the responsive content matches a corresponding segment of the opt-out content, the at least one processor can be further operable to: determine whether the corresponding segment of the opt-out content, that matches the corresponding segment of the responsive content, matches a corresponding segment of opt-in content, the opt-in content being associated with a given additional user or a given additional entity that has not opted-out of: the GM being trained on additional data, that is associated with the given additional user or the given additional entity, since a last training cycle for the GM, or the GM being able to use the additional data, that is associated with the given additional user or the given additional entity, in generating the responsive content; and in response to determining that the corresponding segment of the responsive content matches the corresponding segment of the opt-out content, but in response to determining that the corresponding segment of the opt-out content matches a corresponding segment of the opt-in content: refrain from modifying the corresponding segment of the responsive content; and cause the responsive content to be rendered at the client device of the user.

In some versions of those implementations, the instructions to modify the corresponding segment of the responsive content can be further in response to determining that no corresponding segment of the opt-in content matches the corresponding segment of the opt-out content.

In additional or alternative versions of those implementations, the at least one processor can be further operable to: cause a corresponding hyperlink to the opt-in content to be rendered at the client device of the user and along with the responsive content.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the steps of the aforementioned systems. Some implementations also include a method implemented by one or more processors to perform any of the steps of the aforementioned systems.

What is claimed is:

1. A system comprising:
- at least one processor; and
- memory storing instructions that, when executed by the at least one processor, cause the at least one processor to be operable to:
  - receive user input that is associated with a client device of a user;
  - generate, based on processing at least the user input and using a generative model (GM), responsive content that is responsive to the user input;
  - determine whether a corresponding segment of the responsive content matches a corresponding segment of opt-out content, the opt-out content being associated with a given user or a given entity that has opted-out of: the GM being trained on data, that is associated with the given user or the given entity, since a last training cycle for the GM, or the GM being able to use the data, that is associated with the given user or the given entity, in generating the responsive content; and
  - in response to determining that a corresponding segment of the responsive content matches a corresponding segment of the opt-out content:
    - determine whether the corresponding segment of the opt-out content, that matches the corresponding segment of the responsive content, matches a corresponding segment of opt-in content, the opt-in content being associated with a given additional user or a given additional entity that has not opted-out of: the GM being trained on additional data, that is associated with the given additional user or the given additional entity, since a last training cycle for the GM, or the GM being able to use the additional data, that is associated with the given additional user or the given additional entity, in generating the responsive content;
  - in response to determining that the corresponding segment of the opt-out content matches a corresponding segment of the opt-in content:
    - refrain from modifying the corresponding segment of the responsive content; and
    - cause the responsive content to be rendered at the client device of the user; and
  - in response to determining that the corresponding segment of the opt-out content does not match a corresponding segment of the opt-in content:
    - modify the corresponding segment of the responsive content to generate modified responsive content; and
    - cause the modified responsive content, in lieu of the responsive content, to be rendered at the client device of the user.

2. The system of claim 1, wherein the at least one processor is further operable to:
- receive, from the given user or the given entity, an indication that the given user or the given entity desires to opt-out of the GM being trained on the data or the GM being able to use the data in generating the responsive content; and
- in response to receiving the indication that the given user or the given entity desires to opt-out of the GM being trained on the data or the GM being able to use the data in generating the responsive content:
  - determine, for the given user or the given entity, the opt-out content; and
  - store, in one or more databases, the opt-out content.

3. The system of claim 2, wherein the instructions to determine the opt-out content for the given user or the given entity comprise instructions to:
- identify content that is associated with the given user or the given entity;
- normalize, using one or more normalization operations, the content that is associated with the given user or the given entity to generate normalized content;
- segment the normalized content into a plurality of normalized content segments; and
- store, in one or more of the databases, the plurality of normalized content segments as the opt-out content.

4. The system of claim 3, wherein the at least one processor is further operable to:
- normalize, using the one or more normalization operations, the responsive content to generate normalized responsive content; and
- segment the normalized responsive content into a plurality of normalized responsive content segments.

5. The system of claim 4, wherein the instructions to determine whether a corresponding segment of the responsive content matches a corresponding segment of the opt-out content comprise instructions to:
- determine, based on a comparison of the plurality of normalized content segments to the plurality of normalized responsive content segments, whether a corresponding segment of the responsive content matches a corresponding segment of the opt-out content.

6. The system of claim 5, wherein the instructions to determine whether a corresponding segment of the responsive content matches a corresponding segment of the opt-out content based on the comparison of the plurality of normalized content segments to the plurality of normalized responsive content segments comprise instructions to:

determine a corresponding quantity of alphanumeric characters in a normalized instance of the corresponding segment of the responsive content that need to be inserted, deleted, and/or substituted to result in a normalized instance of the corresponding segment of the content;

determine a corresponding edit distance between the corresponding segment of the responsive content and the corresponding segment of the content as a function of (a) the corresponding quantity of alphanumeric characters in the normalized instance of the corresponding segment of the responsive content that need to be inserted, deleted, and/or substituted to result in the normalized instance of the corresponding segment of the content; and (b) a corresponding total quantity of alphanumeric characters in the normalized instance of the corresponding segment of the content; and in response to determining that the corresponding edit distance between the corresponding segment of the responsive content and the corresponding segment of the content satisfies an edit distance threshold:

determine that a corresponding segment of the responsive content matches a corresponding segment of the opt-out content.

7. The system of claim 4, wherein the plurality of normalized content segments are stored in one or more of the databases as the opt-out content prior to the user input being received, and wherein the responsive content is normalized and segmented subsequent to the responsive content being generated.

8. The system of claim 2, wherein the instructions to determine the opt-out content for the given user or the given entity comprise instructions to:

identify content that is associated with the given user or the given entity;

process, using a hash function, the content that is associated with the given user or the given entity to generate a plurality of corresponding hashes for the content; and store, in one or more of the databases, the plurality of corresponding hashes for the content as the opt-out content.

9. The system of claim 8, wherein the at least one processor is further operable to:

prior to processing the content that is associated with the given user or the given entity to generate the plurality of corresponding hashes for the content and using the hash function:

normalize, using one or more normalization operations, the content that is associated with the given user or the given entity to generate normalized content;

segment the normalized content into a plurality of normalized content segments; and wherein the instructions to process the content that is associated with the given user or the given entity to generate the plurality of corresponding hashes for the content and using the hash function comprise instructions to:

process, using the hash function, the plurality of normalized content segments to generate the plurality of corresponding hashes for the content as the opt-out content.

10. The system of claim 8, wherein the at least one processor is further operable to:

process, using the hash function, the responsive content to generate a plurality of corresponding hashes for the responsive content.

11. The system of claim 10, wherein the at least one processor is further operable to:

prior to processing the responsive content to generate the plurality of corresponding hashes for the responsive content and using the hash function:

normalize, using one or more normalization operations, the responsive content to generate normalized responsive content;

segment the normalized responsive content into a plurality of normalized responsive content segments; and wherein the instructions to process the responsive content to generate the plurality of corresponding hashes for the responsive content and using the hash function comprise instructions to:

process, using the hash function, the plurality of normalized responsive content segments to generate the plurality of corresponding hashes for the responsive content.

12. The system of claim 10, wherein the instructions to determine whether a corresponding segment of the responsive content matches a corresponding segment of the opt-out content comprise instructions to:

determine, based on a comparison of the plurality of corresponding hashes for the content to the plurality of corresponding hashes for the responsive content, whether a corresponding segment of the responsive content matches a corresponding segment of the opt-out content.

13. The system of claim 10, wherein the plurality of corresponding hashes for the content are stored in one or more of the databases as the opt-out content prior to the user input being received, and wherein the plurality of corresponding hashes for the responsive content are generated subsequent to the responsive content being generated.

14. The system of claim 1, wherein the at least one processor is further operable to:

determine, based on the user input, one or more search queries;

obtain, based on the one or more search queries, a plurality of search result documents; and wherein one or more of the plurality of search result documents are processed along with the user input and using the GM to generate the responsive content that is responsive to the user input.

15. The system of claim 14, wherein the at least one processor is further operable to:

determine whether one or more of the search result documents are associated with the given user or the given entity that has opted-out of the GM being trained on the data or the GM being able to use the data in generating the responsive content; and in response to determining that one or more of the search result documents are associated with the given user or the given entity that has opted-out of the GM being trained on the data or the GM being able to use the data in generating the responsive content:

classify the one or more of the search result documents that are associated with the given user or the given entity as the opt-out content.

16. The system of claim 15, wherein the at least one processor is further operable to:

normalize, using one or more normalization operations, the one or more of the search result documents that are associated with the given user or the given entity to generate normalized content;

segment the normalized content into a plurality of normalized content segments;

normalize, using the one or more normalization operations, the responsive content to generate normalized responsive content;

segment the normalized responsive content into a plurality of normalized responsive content segments; and wherein the instructions to determine whether a corresponding segment of the responsive content matches a corresponding segment of the opt-out content comprise instructions to:

determine, based on a comparison of the plurality of normalized content segments to the plurality of normalized responsive content segments, whether a corresponding segment of the responsive content matches a corresponding segment of the opt-out content.

17. The system of claim 1, wherein the given user or the given entity, prior to the last training cycle for the GM, was opted-in to allow the GM to be trained on the data and/or was opted-in to allow the GM to be able to use the data in generating the responsive content.

18. The system of claim 1, wherein the at least one processor is further operable to:

prior to a next training cycle of the GM:

cause the data that is associated with the given user or the given entity to be removed from a GM training dataset that will be utilized to train the GM.

19. A method implemented by one or more processors, the method comprising:

receiving user input that is associated with a client device of a user;

generating, based on processing at least the user input and using a generative model (GM), responsive content that is responsive to the user input;

determining whether a corresponding segment of the responsive content matches a corresponding segment of opt-out content, the opt-out content being associated with a given user or a given entity that has opted-out of: the GM being trained on data, that is associated with the given user or the given entity, since a last training cycle for the GM, or the GM being able to use the data, that is associated with the given user or the given entity, in generating the responsive content; and in response to determining that a corresponding segment of the responsive content matches a corresponding segment of the opt-out content:

determining whether the corresponding segment of the opt-out content, that matches the corresponding segment of the responsive content, matches a corresponding segment of opt-in content, the opt-in content being associated with a given additional user or a given additional entity that has not opted-out of: the GM being trained on additional data, that is associated with the given additional user or the given additional entity, since a last training cycle for the GM, or the GM being able to use the additional data, that is associated with the given additional user or the given additional entity, in generating the responsive content;

in response to determining that the corresponding segment of the opt-out content matches a corresponding segment of the opt-in content:

refraining from modifying the corresponding segment of the responsive content; and causing the responsive content to be rendered at the client device of the user; and in response to determining that the corresponding segment of the opt-out content does not match a corresponding segment of the opt-in content:

modifying the corresponding segment of the responsive content to generate modified responsive content; and causing the modified responsive content, in lieu of the responsive content, to be rendered at the client device of the user.

20. A non-transitory computer-readable storage medium storing computer-readable instructions that, when executed by at least one processor, cause the at least one processor to perform operations, the operations comprising:

receiving user input that is associated with a client device of a user;

generating, based on processing at least the user input and using a generative model (GM), responsive content that is responsive to the user input;

determining whether a corresponding segment of the responsive content matches a corresponding segment of opt-out content, the opt-out content being associated with a given user or a given entity that has opted-out of: the GM being trained on data, that is associated with the given user or the given entity, since a last training cycle for the GM, or the GM being able to use the data, that is associated with the given user or the given entity, in generating the responsive content; and in response to determining that a corresponding segment of the responsive content matches a corresponding segment of the opt-out content:

determining whether the corresponding segment of the opt-out content, that matches the corresponding segment of the responsive content, matches a corresponding segment of opt-in content, the opt-in content being associated with a given additional user or a given additional entity that has not opted-out of: the GM being trained on additional data, that is associated with the given additional user or the given additional entity, since a last training cycle for the GM, or the GM being able to use the additional data, that is associated with the given additional user or the given additional entity, in generating the responsive content;

in response to determining that the corresponding segment of the opt-out content matches a corresponding segment of the opt-in content:

refraining from modifying the corresponding segment of the responsive content; and causing the responsive content to be rendered at the client device of the user; and in response to determining that the corresponding segment of the opt-out content does not match a corresponding segment of the opt-in content:

modifying the corresponding segment of the responsive content to generate modified responsive content; and causing the modified responsive content, in lieu of the responsive content, to be rendered at the client device of the user.

* * * * *